United States Patent
Bishop

(10) Patent No.: US 11,072,538 B2
(45) Date of Patent: Jul. 27, 2021

(54) MODULES OF A MODULAR SUPPORT SYSTEM

(71) Applicant: Bishop Ascendant, Inc., West Caldwell, NJ (US)

(72) Inventor: Justin Bishop, West Caldwell, NJ (US)

(*) Notice: Subject to any disclaimer, the term of this patent is extended or adjusted under 35 U.S.C. 154(b) by 0 days.

(21) Appl. No.: 16/994,418

(22) Filed: Aug. 14, 2020

(65) Prior Publication Data

US 2021/0061673 A1 Mar. 4, 2021

Related U.S. Application Data

(60) Provisional application No. 62/922,731, filed on Aug. 26, 2019.

(51) Int. Cl.
| | | |
|---|---|---|
| *E04B 1/24* | (2006.01) | |
| *C02F 1/00* | (2006.01) | |
| *G06N 20/00* | (2019.01) | |
| *H02S 40/30* | (2014.01) | |
| *G06K 9/62* | (2006.01) | |
| *H02S 20/30* | (2014.01) | |
| *H02S 40/38* | (2014.01) | |
| *C02F 1/32* | (2006.01) | |
| *C02F 1/44* | (2006.01) | |
| *C02F 103/00* | (2006.01) | |

(52) U.S. Cl.
CPC .............. *C02F 1/001* (2013.01); *C02F 1/32* (2013.01); *C02F 1/444* (2013.01); *E04B 1/2403* (2013.01); *G06K 9/6201* (2013.01); *G06N 20/00* (2019.01); *H02S 20/30* (2014.12); *H02S 40/30* (2014.12); *H02S 40/38* (2014.12); *C02F 2103/007* (2013.01); *E04B 2001/2424* (2013.01)

(58) Field of Classification Search
CPC ............................. E04B 1/2403; H02S 40/30
See application file for complete search history.

(56) References Cited

U.S. PATENT DOCUMENTS

| | | |
|---|---|---|
| 4,098,402 A | 7/1978 | Rogg |
| 5,468,373 A | 11/1995 | Chou |
| 7,469,541 B1 | 12/2008 | Melton et al. |
| 8,186,518 B2 | 5/2012 | Barker et al. |

(Continued)

FOREIGN PATENT DOCUMENTS

| | | |
|---|---|---|
| CN | 201198637 Y | 2/2009 |
| CN | 203315814 U | 12/2013 |

(Continued)

OTHER PUBLICATIONS

International Search Report and Written Opinion dated Nov. 23, 2020, on Application No. PCT/US20/47690.

(Continued)

*Primary Examiner* — Babajide A Demuren

(57) ABSTRACT

A modular support system includes a central core and operation modules arranged radially around the central core. The operation modules include a first operation module that includes an enclosure structure forming a first interior volume. The enclosure structure has a rear wall. The first operation module further includes a device disposed in the first interior volume, wherein the device is associated with one or more of water treatment, power generation, or communication. The first operation module further includes a first electrical interconnect configured to electrically couple the device to the central core through the rear wall.

20 Claims, 15 Drawing Sheets

(56) References Cited

U.S. PATENT DOCUMENTS

| | | |
|---|---|---|
| 8,415,829 B2 | 4/2013 | Di Christofaro |
| 2007/0023341 A1 | 2/2007 | Bittner |
| 2008/0196758 A1 | 8/2008 | McGuire |
| 2013/0153492 A1 | 6/2013 | Amitai |
| 2016/0031148 A1 | 2/2016 | Hendrickson et al. |
| 2018/0181876 A1 | 6/2018 | Zhuo et al. |
| 2018/0294766 A1 | 10/2018 | Mori et al. |
| 2019/0106243 A1 | 4/2019 | Maroofian et al. |

FOREIGN PATENT DOCUMENTS

| | | |
|---|---|---|
| KR | 1020170002263 A | 1/2017 |
| WO | 2018124291 A1 | 7/2008 |
| WO | 2011115419 A2 | 9/2011 |

OTHER PUBLICATIONS

International Search Report and Written Opinion dated Nov. 24, 2020, on Application No. PCT/US20/47691.
International Search Report and Written Opinion dated Oct. 5, 2020, on Application No. PCT/US20/47682.
https://waterhoundfutures.com/ retrieved Nov. 24, 2020.
https://www.libelium.com/iot-products/plug-sense/ retrieved Nov. 24, 2020.
https://watly.co/the-technology/ retrieved Nov. 24, 2020.
https://us.watergen.com/product/gen-I/ retrieved Nov. 24, 2020.

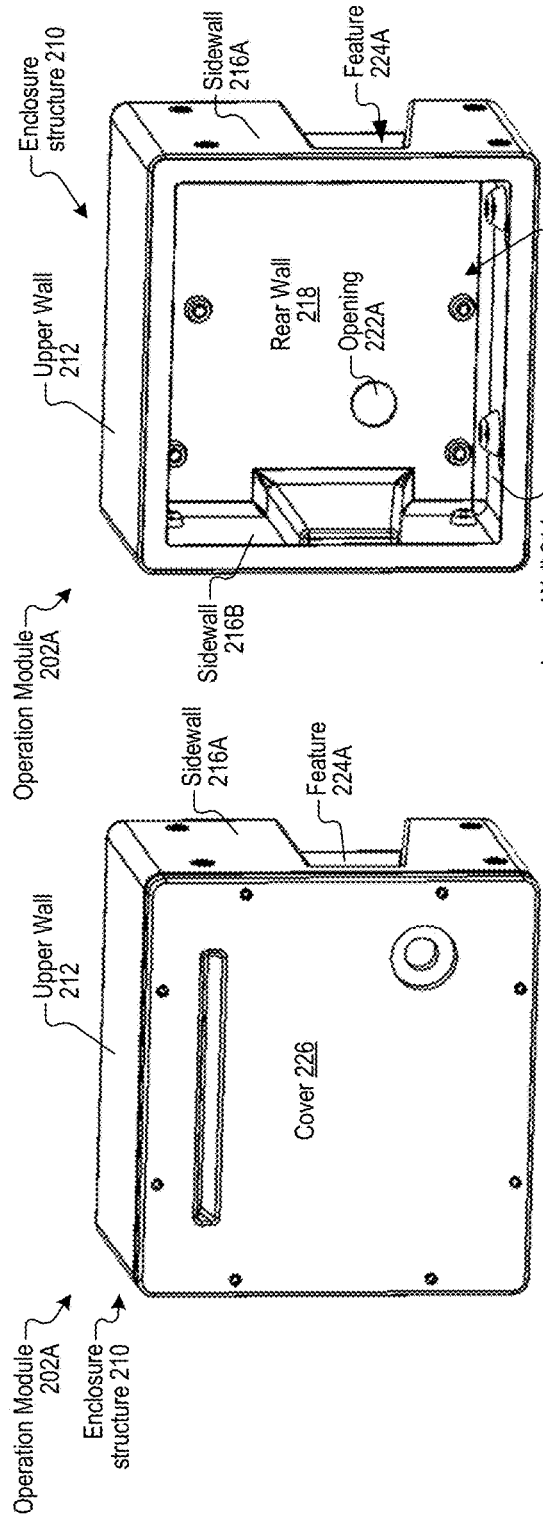
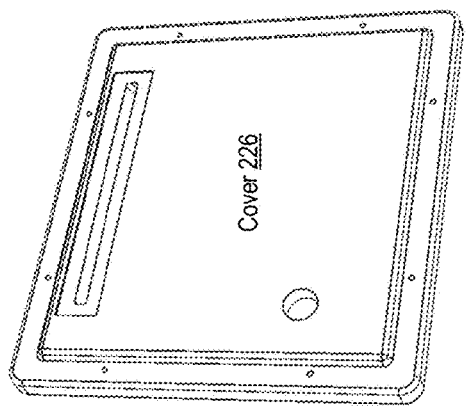
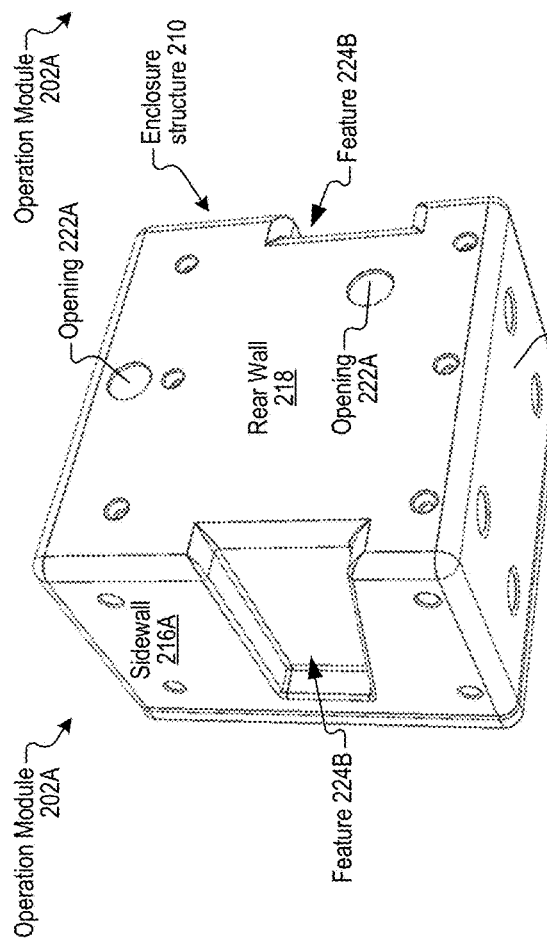

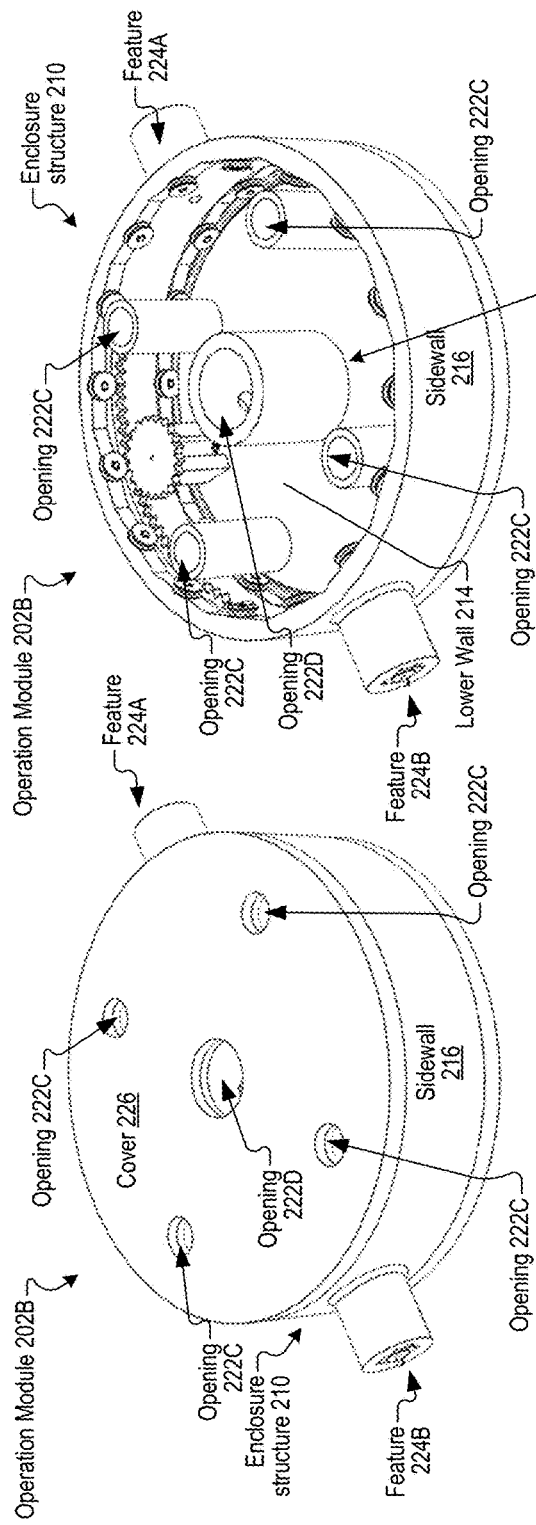
FIG. 2E
FIG. 2F
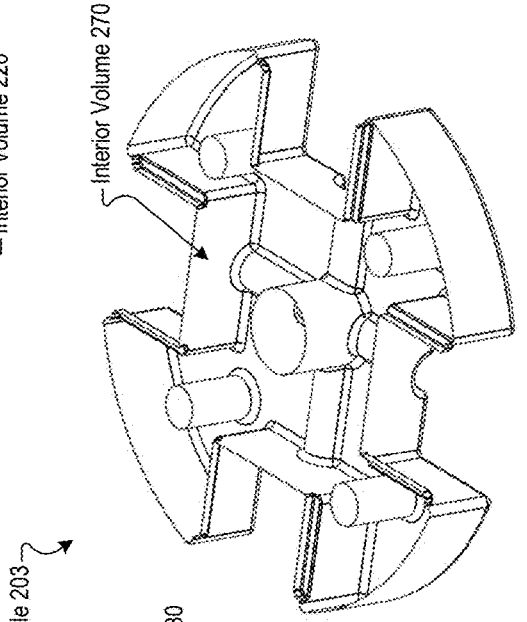
FIG. 2H
FIG. 2G

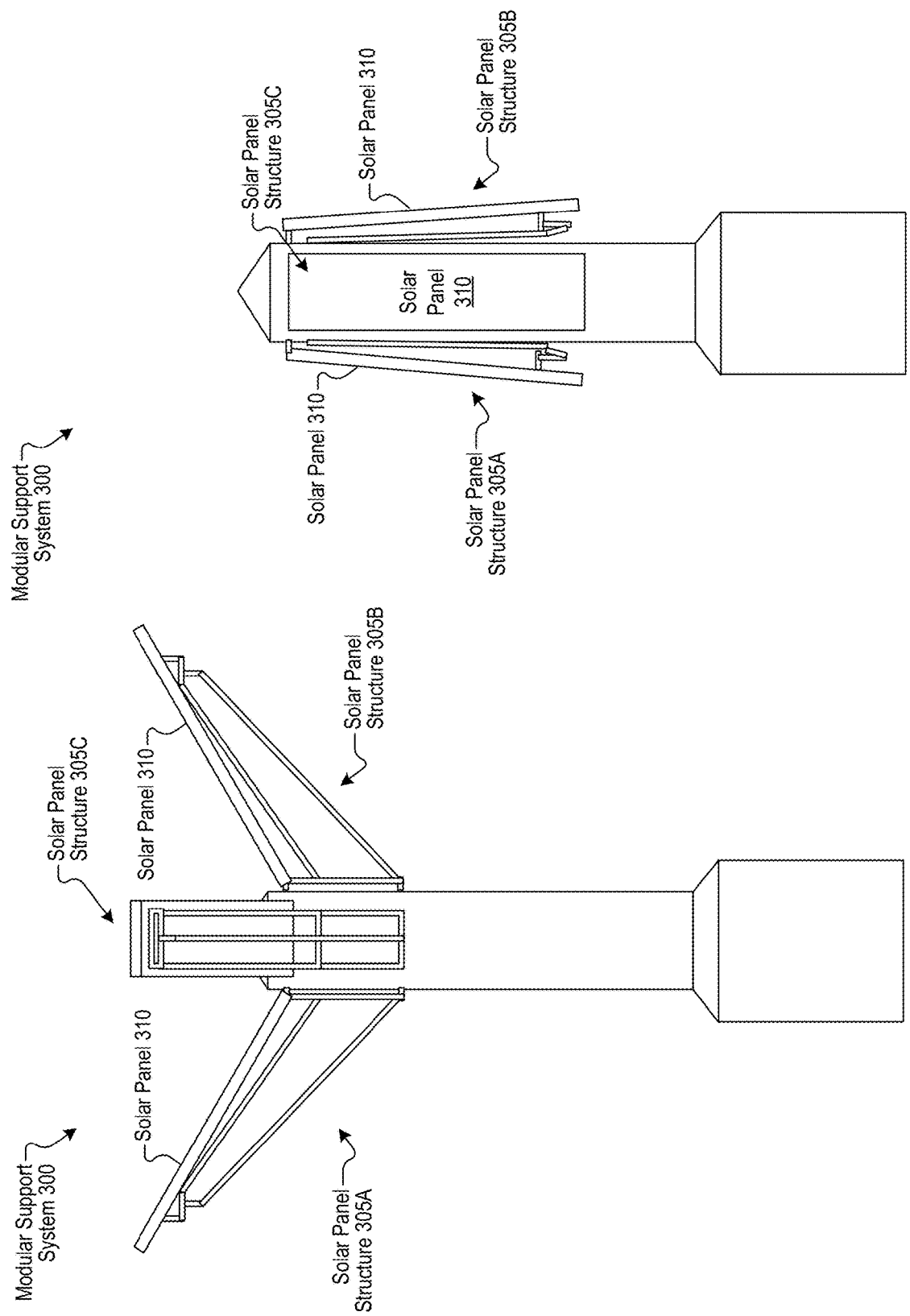

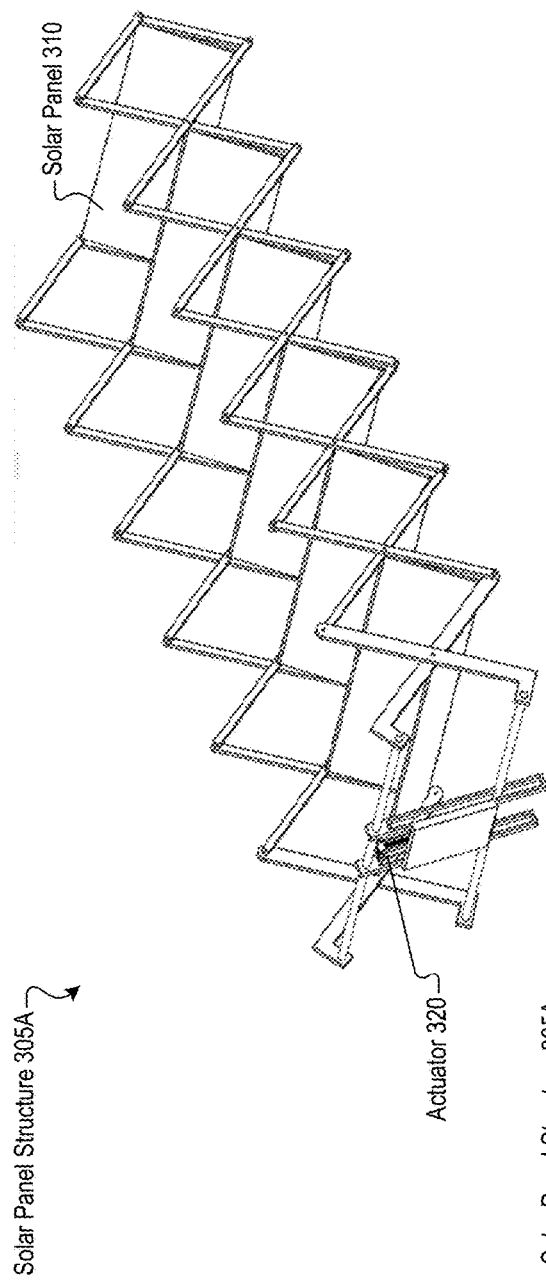
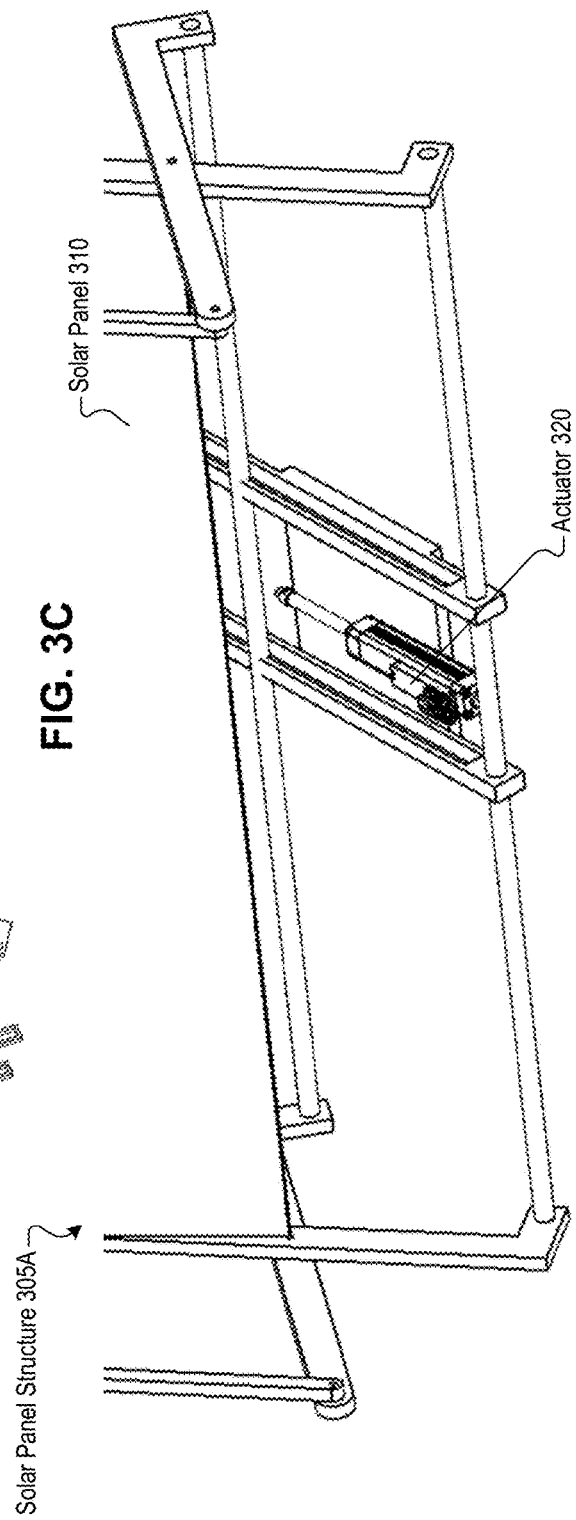
FIG. 3C
FIG. 3D

FIG. 4A
Modular Support System 400A
- Communication Module 402A
- Contaminated Water Distribution Module 402B
- Water Treatment Module 402C
- Water Treatment Module 402C
- Water Treatment Module 402C
- Water Treatment Module 402C
- Control Module 402D
- Pump Module 402E
- Clean Water Module 402F

FIG. 4B
Modular Support System 400B
- Communication Module 402A
- Power Transfer Module 402G
- Solar Panel Module 402H
- Module 402
- Module 402
- Module 402
- Control Module 402D
- Battery Bank Module 402I
- Clean Water Module 402F

FIG. 4C
Modular Support System 400C
- Contaminated Water Distribution Module 402B
- Water Treatment Module 402C
- Water Treatment Module 402C
- Water Treatment Module 402C
- Water Treatment Module 402C
- Control Module 402D
- Pump Module 402E
- Clean Water Module 402F

FIG. 4D
Modular Support System 400D
- Large Particulate Filter Module 402J
- Fine Particulate Filter Module 402K
- UV Light Module 402L
- Chemical Treatment Module 402M
- Module 402
- Module 402
- Module 402

FIG. 4E
Modular Support System 400E
- Communication Module 402A
- Fine Particulate Filter Module 402K
- Chemical Treatment Module 402M
- UV Light Module 402L
- Battery Bank Module 402I
- Communication Module 402A
- Clean Water Module 402F

FIG. 4F
Modular Support System 400F
- Communication Module 402A
- Communication Module 402A
- Chemical Filter Module 402M
- Battery Bank Module 402I
- Clean Water Module 402F

FIG. 4G
Modular Support System 400G
- Communication Module 402A
- Fine Particulate Filter Module 402K
- Battery Bank Module 402I

MODULES OF A MODULAR SUPPORT SYSTEM

RELATED APPLICATION

This application claims benefit of U.S. Provisional Patent Application 62/922,731, filed Aug. 26, 2019, the entire content of which is incorporated by reference herein.

TECHNICAL FIELD

Embodiments of the present disclosure relate to support systems, and in particular to modular support systems.

BACKGROUND

In some locations, such as unpopulated areas, underdeveloped areas, disaster areas, and the like, there are limited resources. The limited resources may include limited amounts of clean water, electricity, and/or communication.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIGS. 2A-F illustrate operation modules of a modular support system, according to certain embodiments.

FIGS. 2G-H illustrate an interlocking module of a modular support system, according to certain embodiments.

FIGS. 3A-D illustrate solar panel structures of modular support systems, according to certain embodiments.

FIGS. 4A-G illustrate modular support systems, according to certain embodiments.

DETAILED DESCRIPTION OF EMBODIMENTS

Figure 1A:
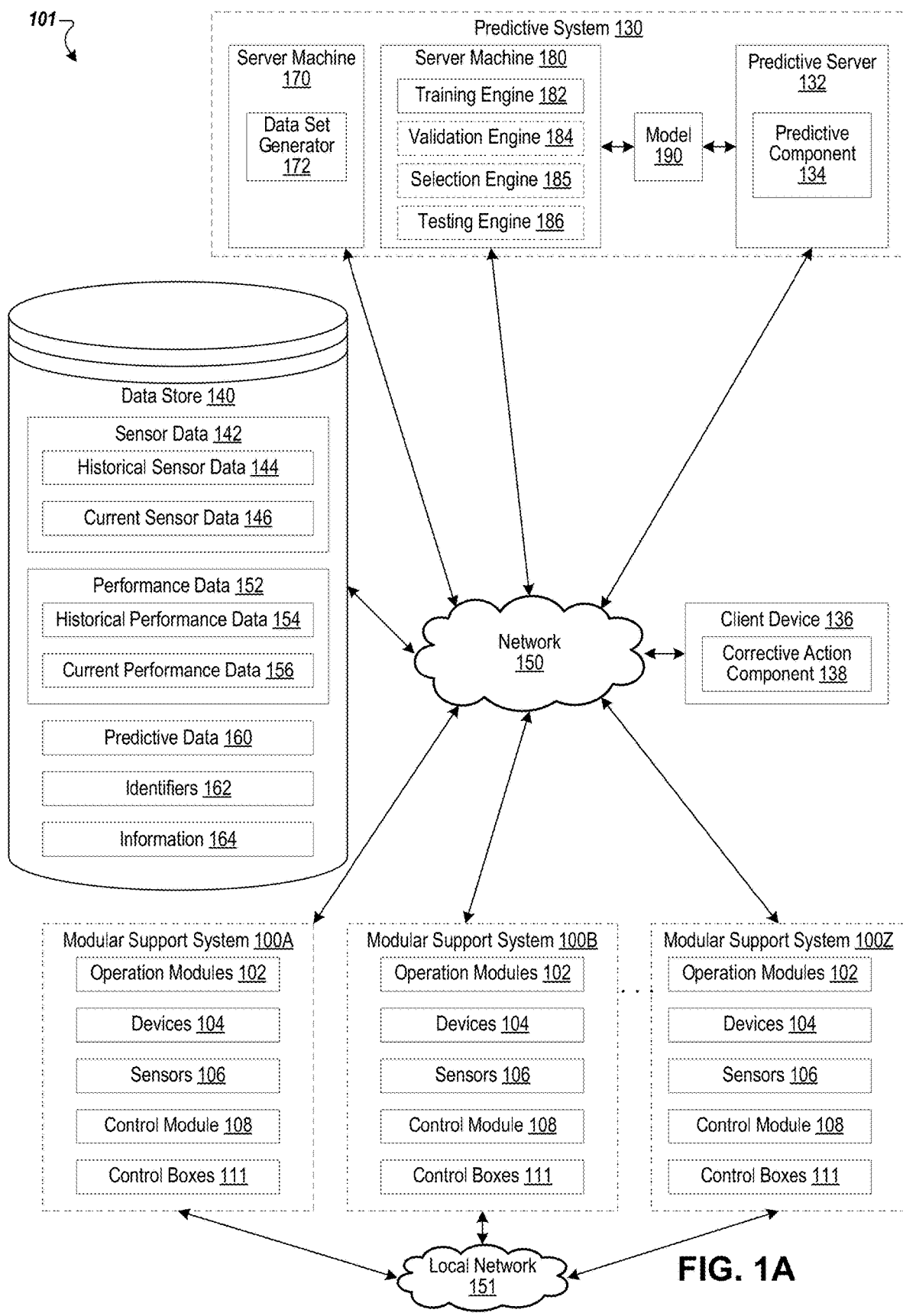
FIG. 1A is a block diagram illustrating an exemplary system architecture, according to certain embodiments.

Embodiments described herein are related to modular support systems.

The ability to survive and thrive often depends on access to resources, such as clean water, electricity, and communication.

Many areas of the world face scarcity of resources. For example, there is a lack of reliable sources of clean water, electricity, and/or communication in some rural environments, some remote areas, in some under-developed areas, and in some disaster zones.

Conventional methods of providing clean water, electricity, and/or communication are either ad hoc or large scale. Conventional ad hoc solutions include distributing water bottles, traveling long distances to procure clean water, using non-reliable home filtration methods, and the like. Conventional ad hoc solutions are not scalable, are inefficient, often are not reliable, and can be harmful to users. Conventional large scale solutions include building a water purification plant, building a power plant, installing large satellite dishes, and installing cellular towers. Conventional large scale solutions take a long time to install, are costly, and may not provide the appropriate amount of resources to a location.

Conventional methods of providing water and power to difficult-to-reach locations is both problematic and costly. The lack of communications worsens the problem. In disaster zones, devastated water, power, and communication infrastructure make it very difficult to bring services back on-line in a timely fashion. In some remote regions, there is little or no infrastructure for residents to access clean water and/or electricity. It is extremely costly and difficult to build and deploy conventional systems to provide clean water, electricity, and/or communication.

The devices, systems, and methods disclosed herein provide a modular support system. The modular support system includes a central core (e.g., a hollow cylindrical tower) and operation modules arranged radially around the central core. In some embodiments, interlocking modules are arranged radially around the central core and the operation modules are inserted into the interlocking modules.

An operation module includes an enclosure structure forming an interior volume. The enclosure structure has an upper wall, a lower wall, and sidewalls. In some embodiments, one or more devices are disposed in the interior volume of the operation module. The one or more devices is associated with one or more of water treatment, generating solar energy, or communication. An electrical interconnect electrically couples the one or more devices to the central core through a rear wall of the operation module.

In some embodiments, one or more of the operation modules provide water treatment. A first operation module receives water to be treated. A second operation module disposed under the first operation module receives the water from the first operation module and performs a first type of treatment of the water. A third operation module disposed under the second operation module receives the water from the second operation module and performs a second type of treatment of the water. The different types of treatment include one or more of zeolite filtration, activated carbon filtration, membrane filtration, ultrafiltration (UF), ultraviolet (UV) treatment, and/or the like. A forth operation module disposed under the third operation module receives and stores the water for usage.

In some embodiments, one or more of the operation modules provides power generation. One or more solar panels are attached to an operation module. Another operation module includes one or more batteries to store the energy received via the solar panels. An operation module includes a control module (e.g., processing device) to monitor energy received by the batteries and energy provided by the batteries for power usage.

In some embodiments, one or more of the operation modules provides communication via a communication device (e.g., cellular module, satellite, etc.) disposed in a corresponding operation module. In some embodiments, the communication device is configured to provide one or more of water quality data, water usage data, solar energy generation data, energy consumption data, sensor data, and/or the like to a server device. In some embodiments, the modular support system provides any combination of operations (e.g., two or more of water treatment, power generation, and communication).

In some embodiments, the modular support system has a processing device that receives identifiers of the operation modules and determines capabilities of the operation modules. The processing device further receives sensor data from sensors associated from one or more of the operation modules. Responsive to the capabilities not matching the sensor data, the processing device causes performance of a corrective action.

In some embodiments, historical sensor data associated with modular support systems and historical performance data associated with the modular support systems are received over time. The historical performance data can correspond to performance (e.g., power generation, water generation, pressure data, etc.) of the modular support systems responsive to performing corresponding corrective actions. A machine learning model is trained using data input including the historical sensor data and target output including the historical performance data. Current sensor data (e.g., current pressure, current water or power generation, current communication bandwidth, etc.) is received and is provided as input to a trained machine learning model to receive output associated with predictive data (e.g., predicted performance data associated with corrective actions). Based on the predictive data, one or more corrective actions are performed for the modular support system. Performance data is received after the performance of the corrective action. The sensor data and performance data are used to further train (e.g., re-train) the trained machine learning model.

The systems, devices, and methods disclosed herein have advantages over conventional solutions. The modular support system is safer, more efficient, and more reliable than conventional ad hoc solutions. The modular support system is quicker to install, less costly, and can provide the appropriate amount of resources to a location compared to a conventional water purification plant, power plant, satellite, or cellular tower. The sensor data from the modular support systems can be used in determining demand of resources of a location. The modular support system is scalable and customizable to local conditions. The modular support system is a mass producible, compact, portable structure that can adapt and be placed in remote areas of the world rapidly to deliver clean water, power, and/or communication. The modular support system provides key elements to sustaining life in the modern world (e.g., water, power, and communication in a simple rugged integrated package).

FIG. 1A is a block diagram illustrating an exemplary system 101 (exemplary system architecture), according to certain embodiments. The system 101 includes one or more modular support systems 100 (e.g., modular support systems 100 of FIGS. 1B-D), predictive server 132, client device 136, and data store 140. In some embodiments, predictive server 132 is part of predictive system 130. In some embodiments, predictive system 130 further includes server machines 170 and 180.

In some embodiments, one or more of modular support systems 100, client device 136, predictive server 132, data store 140, server machine 170, and/or server machine 180 are coupled to each other via a network 150 (e.g., for generating predictive data 160, for controlling modular support systems 100, for performing corrective actions, etc.). In some embodiments, network 150 is a public network that provides client device 136 with access to the modular support systems 100, predictive server 132, data store 140, and other publically available computing devices. In some embodiments, network 150 is a private network that provides client device 136 access to modular support systems 100, predictive server 132, data store 140, and other privately available computing devices. In some embodiments, network 150 includes one or more Wide Area Networks (WANs), Local Area Networks (LANs), wired networks (e.g., Ethernet network), wireless networks (e.g., an 802.11 network or a Wi-Fi® network), cellular networks (e.g., a Long Term Evolution (LTE) network), radar units, transmission antenna, reception antenna, microwave transmitter, microwave receiver, sonar devices, Lidar devices, routers, hubs, switches, server computers, cloud computing networks, and/or a combination thereof.

Modular support system 100 includes one or more integrated systems (e.g., that each provides one or more resources), such as a water treatment system, a power generation system, a communication system, and/or the like. Modular support system 100 includes multiple modules (e.g., operation modules 102, interlock modules 103, modules 109, etc. of FIGS. 1C-D) for providing one or more resources (e.g., clean water, energy, communication, etc.). The modular support system 100 includes operation modules 102 (e.g., arranged radially around a central core of the modular support system 100). One or more of the operation modules 102 include one or more devices 104. Devices 104 include one or more of a water treatment device (e.g., filtration media, ultrafiltration (UF) device, ultraviolet (UV) device, liquid bladder, granular material, etc.), a pump, an energy storage device (e.g., battery), a communication device (e.g., antenna, cellular module, radio transmitter, radar unit, transmission and reception antennas, microwave transmitters and receivers, etc.), equipment associated with one or more solar panels (e.g., motor for position of the one or more solar panels, an inverter, a charge controller, etc.), valves, a motor, a circuit board, a power source, a fuel cell, cameras, microphones, radio-frequency interference (RFI shielding), electromagnetic interference (EMI) shielding, radiation shielding, weather instrumentation, target acquisition device, sonar device, Lidar device, identification strobes, light digital displays, computer device, and/or the like. The modular support system 100 includes sensors 106 (e.g., located in operation modules 102, located outside of operation modules 102, flow sensors, water quality sensors, etc.). In some embodiments, sensors 106 provide at least a portion of the sensor data 142. Modular support system 100 includes a control module 108 (e.g., processing device, computer system 1100 of FIG. 11). In some embodiments, control module 108 causes data (e.g., sensor data 142) to be provided to one or more of predictive system 130, client device 136, and/or data store 140 via network 150. In some embodiments, control module 108 performs operations of predictive component 134 and/or corrective action component 138. In some embodiments, control module 108 receives instructions (e.g., a schedule and/or updates to a schedule) to control operation (e.g., water treatment, backwash operation, preventative maintenance, solar panel operation, etc.) of operation modules 102. In some embodiments, each operation module 102 includes a control box 111 (e.g., controller, processing device) for communicating with the control module 108 of the modular support system 100 and/or for controlling the operation module 102 (e.g., based on instructions received from the control module 108 of the modular support system 100). In some embodiments, the control box 111 can perform one or more operations of the control module 108. In some embodiments, the modular support system 100 includes multiple control modules 108 (e.g., an overall control module 108, a control module 108 for controlling water treatment, a control module 108 for controlling power generation and/or storage, a control module for controlling communications, etc.).

In some embodiments, one or more modular support systems 100A-Z communicate with each other. In some embodiments, the modular support systems 100A receives data (e.g., instructions, schedule, sensor data, etc.) from one or more of predictive system 130, client device 136, and/or data store 140 and provides the data to the one or more modular support systems 100B-Z. In some embodiments, a modular support system 100A receives data from one or more other modular support systems 100B-Z and provides the data to one or more of predictive system 130, client device 136, and/or data store 140.

In some embodiments, one or more modular support systems 100A-Z communicate over network 150. In some embodiments, one or more modular support systems 100A-Z communicate over a local network 151. Local network 151 may be a computing network that provides one or more communication channels between modular support systems 100. In some examples, local network 151 is a peer-to-peer network that does not rely on a pre-existing network infrastructure (e.g., access points, switches, routers) and modular support systems 100 replace the networking infrastructure to route communications between the modular support systems 100. Local network 151 may be a wireless network that is self-configuring and enables modular support systems 100 to contribute to local network 151 and dynamically connect and disconnect from local network 151 (e.g., ad hoc wireless network). In some examples, local network 151 is a computing network that includes networking infrastructure that enables modular support systems 100 to communicate with other modular support systems 100. The local network 151 may or may not have access to the public network (e.g., internet, network 150). For example, an access point or device that may function as an access point to enable modular support systems 100 to communicate with one another without providing internet access. In some embodiments, the local network 151 provides access to a larger network such as network 150 (e.g., Internet). In some embodiments, local network 151 is based on any wireless or wired communication technology and may connect a first modular support system 100 directly or indirectly (e.g., involving an intermediate device, such as an intermediate modular support system 100) to a second modular support system 100. The wireless communication technology may include Bluetooth®, Wi-Fi®, infrared, ultrasonic, or other technology. The wired communication may include universal serial bus (USB), Ethernet, RS 232, or other wired connection. The local network 151 may be an individual connection between two modular support systems 100 or may include multiple connections.

In some embodiments, the client device 136 includes a computing device such as Personal Computers (PCs), laptops, mobile phones, smart phones, tablet computers, netbook computers, etc. In some embodiments, the client device 136 includes a corrective action component 138. Client device 136 includes an operating system that allows users to one or more of generate, view, or edit data (e.g., selection of a modular support system 100, corrective actions associated with modular support systems 100, etc.).

In some embodiments, corrective action component 138 receives user input (e.g., via a Graphical User Interface (GUI) displayed via the client device 136) of an indication associated with a modular support system 100. In some embodiments, the corrective action component 138 transmits the indication to the predictive system 130, receives output (e.g., predictive data 160) from the predictive system 130, determines a corrective action associated with the modular support system 100 based on the output, and causes the corrective action to be implemented. In some embodiments, the corrective action component 138 obtains sensor data 142 (e.g., current sensor data 146) associated with the modular support system 100 (e.g., from data store 140, etc.) and provides the sensor data 142 (e.g., current sensor data 146) associated with the modular support system 100 to the predictive system 130. In some embodiments, the corrective action component 138 stores sensor data 142 in the data store 140 and the predictive server 132 retrieves the sensor data 142 from the data store 140. In some embodiments, the predictive server 132 stores output (e.g., predictive data 160) of the trained machine learning model 190 in the data store 140 and the client device 136 retrieves the output from the data store 140. In some embodiments, the corrective action component 138 receives an indication of a corrective action from the predictive system 130 and causes the corrective action to be implemented.

In some embodiments, a corrective action is associated with one or more of Computational Process Control (CPC), Statistical Process Control (SPC) (e.g., SPC to compare to a graph of 3-sigma, etc.), Advanced Process Control (APC), model-based process control, preventative operative maintenance, design optimization, updating of operating parameters, feedback control, machine learning modification, or the like.

In some embodiments, the corrective action includes providing an alert (e.g., an alarm to replace or repair a component of the modular support system 100 if the predictive data 160 indicates a predicted abnormality, such as an abnormality of the water, a component, modular support system 100, or the like). In some embodiments, the corrective action includes providing feedback control (e.g., modifying operations responsive to the predictive data 160 indicating a predicted abnormality). In some embodiments, the corrective action includes providing machine learning (e.g., causing repair or replacement of a component of the modular support system 100 based on the predictive data 160). In some embodiments, performance of the corrective action includes causing updates to one or more operating parameters of one or more components of the modular support system 100. In some embodiments, the corrective action includes causing preventative maintenance.

In some embodiments, the predictive server 132, server machine 170, and server machine 180 each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc.

The predictive server 132 includes a predictive component 134. In some embodiments, the predictive component 134 receives sensor data 142 (e.g., receive from the client device 136, retrieve from the data store 140) and generates output (e.g., predictive data 160) for performing corrective action associated with the modular support system 100 based on the sensor data 142. In some embodiments, the predictive component 134 uses one or more trained machine learning models 190 to determine the output for performing the corrective action based on the sensor data 142. In some embodiments, trained machine learning model 190 is trained using historical sensor data 146 and historical performance data 154.

In some embodiments, the predictive system 130 (e.g., predictive server 132, predictive component 134) generates predictive data 160 using supervised machine learning (e.g., supervised data set, labeled data, etc.). In some embodiments, the predictive system 130 generates predictive data 160 using semi-supervised learning (e.g., semi-supervised data set, a predictive percentage, etc.). In some embodiments, the predictive system 130 generates predictive data 160 using unsupervised machine learning (e.g., unsupervised data set, clustering, etc.).

In some embodiments, the sensors 106 provide sensor data 142 (e.g., historical sensor data 144, current sensor data 146) associated with modular support system 100. In some embodiments, the sensors 106 include one or more of a pressure sensor, a flow sensor, a temperature sensor, a humidity sensor, a barometer, a rain fall sensor, a light-sensing sensor, an imaging device, electrical current sensor, voltage sensor, a pumping efficiency sensor, a valve position sensor, a location sensor (e.g., global positioning system (GPS) device), and/or the like. In some embodiments, one or more sensors 106 includes sensor probes that measure sensor data 142 including chemical and physical water quality parameters, such as one or more of pH, nitrates ($NO_3$), dissolved ions (e.g., Fluoride ($F^-$), Calcium ($Ca^{2+}$), Nitrate ($NO_3^-$), Chloride ($Cl^-$), Iodide ($I^-$), Cupric ($Cu^{2+}$), Bromide ($Br^-$), Silver ($Ag^+$), Fluoroborate ($BF_4^-$), Ammonia ($NH_4$), Lithium ($Li^+$), Magnesium ($Mg^{2+}$), Nitrite ($NO_2$), Perchlorate ($ClO_4$), Potassium ($K^+$), Sodium ($Na^+$)), dissolved oxygen (DO), and/or the like), conductivity (salinity), oxidation-reduction potential (ORP), turbidity, temperature, and/or the like. In some embodiments, the sensors 106 provide the sensor data 142 during operation of one or more operation modules 102. In some embodiments, the sensor data 142 is used for equipment health, water treatment, energy storage, water usage, energy usage, and/or the like. The sensor data 142 is received over a period of time.

In some embodiments, sensor data 142 is associated with or indicative of operating parameters such as hardware parameters (e.g., settings or components (e.g., size, type, etc.) of the modular support system 100) or process parameters of the modular support system 100. In some embodiments, sensor data 142 is provided while the modular support system 100 performs operations (e.g., water treatment, energy storage, communication, etc.), before the modular support system 100 performs operations, and/or after the modular support system 100 performs operations. In some examples, the sensor data 142 is provided after commissioning, installation, preventative maintenance, and/or replacement of a component. In some embodiments, the sensor data 142 is provided while the modular support system 100 provides a substantially closed environment for one or more operations (e.g., for water treatment.)

In some embodiments, the sensor data 142 (e.g., historical sensor data 144, current sensor data 146, etc.) is processed (e.g., by the client device 136 and/or by the predictive server 132). In some embodiments, processing of the sensor data 142 includes generating features. In some embodiments, the features are a pattern in the sensor data 142 (e.g., slope, width, height, peak, etc.) or a combination of sensor values from the sensor data 142 (e.g., power derived from voltage and current, etc.). In some embodiments, the sensor data 142 includes features and the features are used by the predictive component 134 for obtaining predictive data 160 for performance of a corrective action.

In some embodiments, the data store 140 is memory (e.g., random access memory), a drive (e.g., a hard drive, a flash drive), a database system, or another type of component or device capable of storing data. In some embodiments, data store 140 includes multiple storage components (e.g., multiple drives or multiple databases) that span multiple computing devices (e.g., multiple server computers). In some embodiments, the data store 140 stores one or more of sensor data 142, performance data 152, predictive data 160, identifiers 162, and/or information 164.

Sensor data 142 includes historical sensor data 144 and current sensor data 146. In some embodiments, the sensor data 142 includes pressure data, flow data, temperature data, humidity data, barometer data, rain fall data, light-sensing data, image data, electrical current data, voltage data, pumping efficiency data, valve position data, water quality data (e.g., pH data, dissolved ions data, dissolved oxygen data, conductivity data, oxidation-reduction potential data, turbidity data, temperature data, etc.), environmental conditions data (e.g., temperature, pressure, rainfall, sunlight, etc.) and/or the like. In some embodiments, the corrective action is associated with a difference between the sensor data 142 and threshold data.

Performance data 152 includes historical performance data 154 and current performance data 156. In some embodiments, the performance data 152 is data (e.g., sensor data 142) associated with the modular support system 100 after performance of a corrective action. In some examples, the performance data 152 is pressure data, water level data, water treatment rate data, whether the water treatment rate meets water demand rate, power generation rate, whether the power generation rate meets power demand, communication bandwidth, whether the communication bandwidth meets the communication bandwidth demand, and/or the like (e.g., after performance of a corrective action). In some embodiments, performance data 152 includes data associated with the corrective action performed (e.g., iterations of backwash operations, type of repair or replacement of an operation module 102, historical corrective actions, current corrective actions, etc.).

In some examples, the performance data 152 indicates an abnormality associated with the modular support system 100 (e.g., quality of water to be treated, quality of treated water, energy storage, transmitted communication data, received communication data, component failure, maintenance, energy usage, variance of a component compared to similar components, etc.). In some embodiments, the performance data 152 is associated with yield (e.g., yield of treated water, yield of energy storage, etc.), average yield, predicted yield, predicted abnormality of product, and/or the like. In some examples, responsive to yield over a first period of time being a first amount, the client device 136 provides corrective action based on a prediction that product over an upcoming period of time is to have the same yield.

Historical data includes one or more of historical sensor data 144 and/or historical performance data 154 (e.g., at least a portion for training the machine learning model 190).

Current data includes one or more of current sensor data 146 and/or current performance data 156 (e.g., at least a portion to be input into the trained machine learning model 190 subsequent to training the model 190 using the historical data) for which predictive data 160 is generated (e.g., for performing corrective actions). In some embodiments, the current data is used for retaining the trained machine learning model 190.

In some embodiments, predictive data 160 is predictive performance data of the modular support system 100 (e.g., predictive quality of treated water, amount of treated water, amount of energy stored, quality of data transmitted and/or received, pressure levels, flow rates, percentage of energy converted, amount of water treated, energy consumption, and/or the like). In some embodiments, the predictive data 160 is predictive performance data of the modular support system after performing a particular corrective action.

In some embodiments, identifiers 162 include a unique identifier 162 for each operation module 102. In some embodiments, the identifier is stored in the operation module 102 (e.g., in the control box 111, in a radio frequency identification (RFID) tag, in a near field communication (NFC) tag, in memory, processing device, and/or the like of the operation module 102). In some embodiments, the identifier is indicative of information 164 associated with the operation module 102.

In some embodiments, information 164 includes type of operation module 102, device 104 located in the operation module 102, manufacturing history, installation history, maintenance history, capabilities (e.g., water treatment rate, power generation rate, bandwidth, etc.), specification, software version, contamination that can treat, schedule (e.g., orientation schedule, maintenance schedule, backwash schedule, etc.), and/or the like. In some embodiments, the information 164 is stored in memory of the operation module 102, control module 108, control box 111, data store 140, client device 136, and/or predictive system 130. In some embodiments, the information 164 is updated over time.

Performing operations that result in poor quality of product (e.g., poor water quality of treated water) is costly in time, energy, products (e.g., water treatment media), components, the modular support system 100, etc. By inputting sensor data 142, receiving output of predictive data 160, and performing a corrective action based on the predictive data 160, system 101 has the technical advantage of avoiding the cost of producing, identifying, and discarding defective products (e.g., avoiding producing treated water that has poor water quality).

Performing operations that result in failure of the components of the modular support system 100 is costly in downtime, discarding product, damage to equipment, express ordering replacement components, etc. By inputting sensor data 142, receiving output of predictive data 160, and performing corrective action (e.g., replacement, repair, etc. of components) based on the predictive data 160, system 101 has the technical advantage of avoiding the cost of one or more of unexpected component failure, unscheduled downtime, productivity loss, unexpected equipment failure, loss of product, and the like.

In some embodiments, operating parameters are suboptimal (e.g., too few of iterations of backwashing, etc.) for producing product which has costly results of increased resource (e.g., energy, etc.) consumption, increased amount of time to produce the product, increased component failure, etc. By inputting the sensor data 142 into the trained machine learning model 190, receiving an output of predictive data 160, and performing (e.g., based on the predictive data 160) a corrective action of updating operating parameters (e.g., via a pumping and/or backwash schedule), system 101 has the technical advantage of using optimal operating parameters to avoid costly results of suboptimal operating parameters.

In some embodiments, predictive system 130 further includes server machine 170 and server machine 180. Server machine 170 includes a data set generator 172 that is capable of generating data sets (e.g., a set of data inputs and a set of target outputs) to train, validate, and/or test a machine learning model(s) 190. Some operations of data set generator 172 are described in detail below with respect to FIGS. 8 and 10A. In some embodiments, the data set generator 172 partitions the historical data (e.g., historical sensor data 144 and historical performance data 154) into a training set (e.g., sixty percent of the historical data), a validating set (e.g., twenty percent of the historical data), and a testing set (e.g., twenty percent of the historical data). In some embodiments, the predictive system 130 (e.g., via predictive component 134) generates multiple sets of features. In some examples, a first set of features corresponds to a first set of types of sensor data (e.g., from a first set of sensors, first combination of values from first set of sensors, first patterns in the values from the first set of sensors) that correspond to each of the data sets (e.g., training set, validation set, and testing set) and a second set of features correspond to a second set of types of sensor data (e.g., from a second set of sensors different from the first set of sensors, second combination of values different from the first combination, second patterns different from the first patterns) that correspond to each of the data sets.

Server machine 180 includes a training engine 182, a validation engine 184, selection engine 185, and/or a testing engine 186. In some embodiments, an engine (e.g., training engine 182, a validation engine 184, selection engine 185, and a testing engine 186) refers to hardware (e.g., circuitry, dedicated logic, programmable logic, microcode, processing device, etc.), software (such as instructions run on a processing device, a general purpose computer system, or a dedicated machine), firmware, microcode, or a combination thereof. The training engine 182 is capable of training a machine learning model 190 using one or more sets of features associated with the training set from data set generator 172. In some embodiments, the training engine 182 generates multiple trained machine learning models 190, where each trained machine learning model 190 corresponds to a distinct set of features of the training set (e.g., sensor data from a distinct set of sensors). In some examples, a first trained machine learning model was trained using all features (e.g., X1-X5), a second trained machine learning model was trained using a first subset of the features (e.g., X1, X2, X4), and a third trained machine learning model was trained using a second subset of the features (e.g., X1, X3, X4, and X5) that partially overlaps the first subset of features.

The validation engine 184 is capable of validating a trained machine learning model 190 using a corresponding set of features of the validation set from data set generator 172. For example, a first trained machine learning model 190 that was trained using a first set of features of the training set is validated using the first set of features of the validation set. The validation engine 184 determines an accuracy of each of the trained machine learning models 190 based on the corresponding sets of features of the validation set. The validation engine 184 discards trained machine learning models 190 that have an accuracy that does not meet a threshold accuracy. In some embodiments, the selection engine 185 is capable of selecting one or more trained machine learning models 190 that have an accuracy that meets a threshold accuracy. In some embodiments, the selection engine 185 is capable of selecting the trained machine learning model 190 that has the highest accuracy of the trained machine learning models 190.

The testing engine 186 is capable of testing a trained machine learning model 190 using a corresponding set of features of a testing set from data set generator 172. For example, a first trained machine learning model 190 that was trained using a first set of features of the training set is tested using the first set of features of the testing set. The testing engine 186 determines a trained machine learning model 190 that has the highest accuracy of all of the trained machine learning models based on the testing sets.

In some embodiments, the machine learning model 190 refers to the model artifact that is created by the training engine 182 using a training set that includes data inputs and corresponding target outputs (correct answers for respective training inputs). Patterns in the data sets can be found that map the data input to the target output (the correct answer), and the machine learning model 190 is provided mappings that captures these patterns. In some embodiments, the machine learning model 190 uses one or more of Support Vector Machine (SVM), Radial Basis Function (RBF), clustering, supervised machine learning, semi-supervised machine learning, unsupervised machine learning, k-Nearest Neighbor algorithm (k-NN), linear regression, random forest, neural network (e.g., artificial neural network), etc. In some embodiments, the machine learning model 190 is a multi-variable analysis (MVA) model.

Predictive component 134 provides current sensor data 146 to the trained machine learning model 190 and runs the trained machine learning model 190 on the input to obtain one or more outputs. The predictive component 134 is capable of determining (e.g., extracting) predictive data 160 from the output of the trained machine learning model 190 and determines (e.g., extract) confidence data from the output that indicates a level of confidence that the predictive data 160 corresponds to current performance data 156 (e.g., model 190) of the modular support system 100 at the current sensor data 146. In some embodiments, the predictive component 134 or corrective action component 138 use the confidence data to decide whether to cause a corrective action associated with the modular support system 100 based on the predictive data 160.

The confidence data includes or indicates a level of confidence that the predictive data 160 corresponds to current performance data 156 (e.g., model 190) of the modular support system 100 at the current sensor data 146. In one example, the level of confidence is a real number between 0 and 1 inclusive, where 0 indicates no confidence that the predictive data 160 corresponds to current performance data 156 associated with the current sensor data 146 and 1 indicates absolute confidence that the predictive data 160 corresponds to current performance data 156 associated with the current sensor data 146. Responsive to the confidence data indicating a level of confidence below a threshold level for a predetermined number of instances (e.g., percentage of instances, frequency of instances, total number of instances, etc.) the predictive component 134 causes the trained machine learning model 190 to be re-trained (e.g., based on the current sensor data 146 and current performance data 156, etc.).

Figure 8:
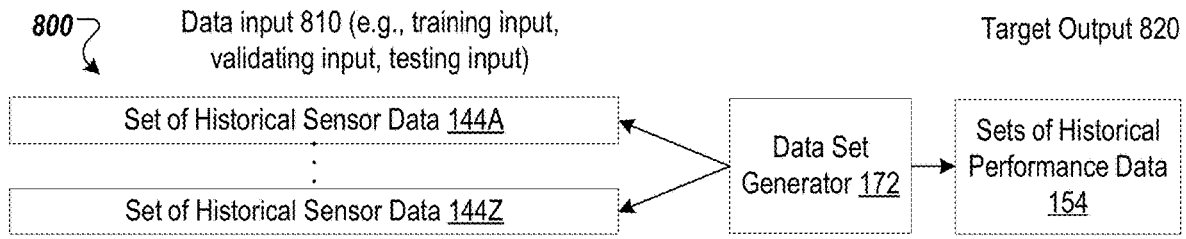
FIG. 8 illustrates a data set generator to create data sets for a machine learning model associated with a modular support system, according to certain embodiments.

For purpose of illustration, rather than limitation, aspects of the disclosure describe the training of one or more machine learning models 190 using historical data (e.g., historical sensor data 144 and historical performance data 154) and inputting current data (e.g., current sensor data 146) into the one or more trained machine learning models 190 to determine predictive data 160 (e.g., predicting current performance data 156). In other implementations, a heuristic model or rule-based model is used to determine predictive data 160 (e.g., without using a trained machine learning model). Predictive component 134 monitors historical sensor data 144 and historical performance data 154. In some embodiments, any of the information described with respect to data inputs 810 of FIG. 8 are monitored or otherwise used in the heuristic or rule-based model.

In some embodiments, the functions of client device 136, predictive server 132, server machine 170, and server machine 180 are be provided by a fewer number of machines. For example, in some embodiments, server machines 170 and 180 are integrated into a single machine, while in some other embodiments, server machine 170, server machine 180, and predictive server 132 are integrated into a single machine. In some embodiments, client device 136 and predictive server 132 are integrated into a single machine.

In general, functions described in one embodiment as being performed by client device 136, predictive server 132, server machine 170, and server machine 180 can also be performed on predictive server 132 in other embodiments, if appropriate. In addition, the functionality attributed to a particular component can be performed by different or multiple components operating together. For example, in some embodiments, the predictive server 132 determines the corrective action based on the predictive data 160. In another example, client device 136 determines the predictive data 160 based on output from the trained machine learning model.

In some embodiments, the corrective action component 138 is part of the predictive system 130 (e.g., predictive server 132). In some embodiments, the predictive component 134 is part of the client device 136.

In addition, the functions of a particular component can be performed by different or multiple components operating together. In some embodiments, one or more of the predictive server 132, server machine 170, or server machine 180 are accessed as a service provided to other systems or devices through appropriate application programming interfaces (API).

In some embodiments, a "user" is represented as a single individual. However, other embodiments of the disclosure encompass a "user" being an entity controlled by a plurality of users and/or an automated source. In some examples, a set of individual users federated as a group of administrators is considered a "user."

Although embodiments of the disclosure are discussed in terms of generating predictive data 160 to perform a corrective action associated with the modular support system 100, in some embodiments, the disclosure can also be generally applied to verifying correct operation of components and production of product. Embodiments can be generally applied to verifying correct operation and production based on different types of data.

Figure 1B:
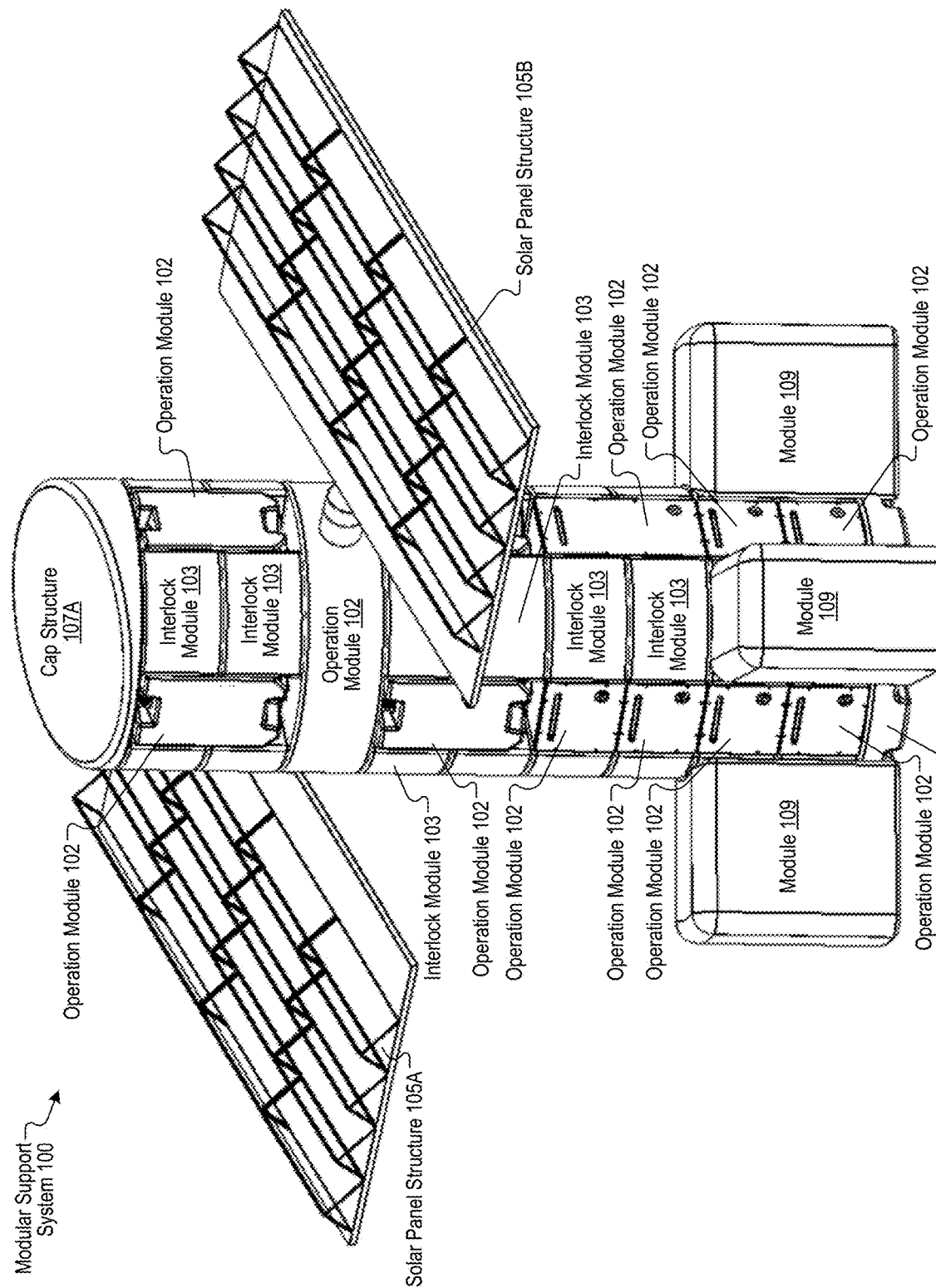
FIGS. 1B-D illustrate modular support systems, according to certain embodiments.
Figure 1D:
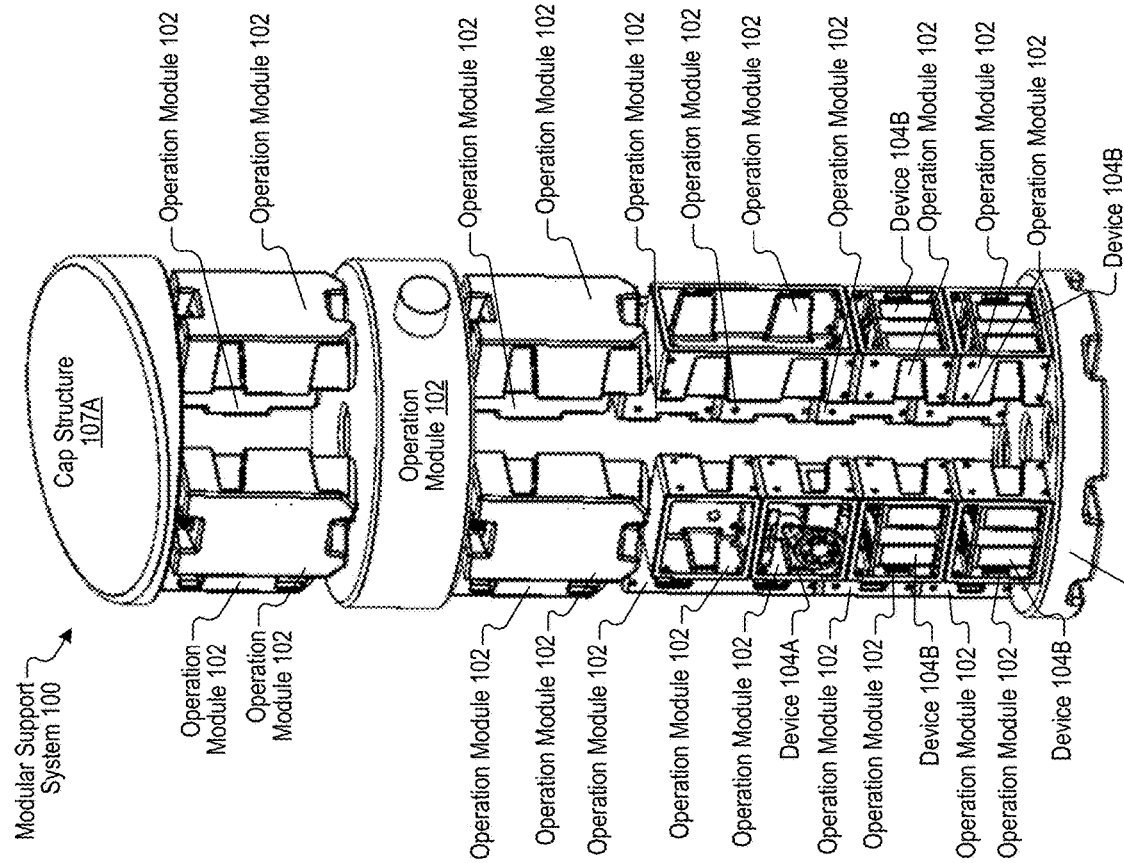
Figure 1C:
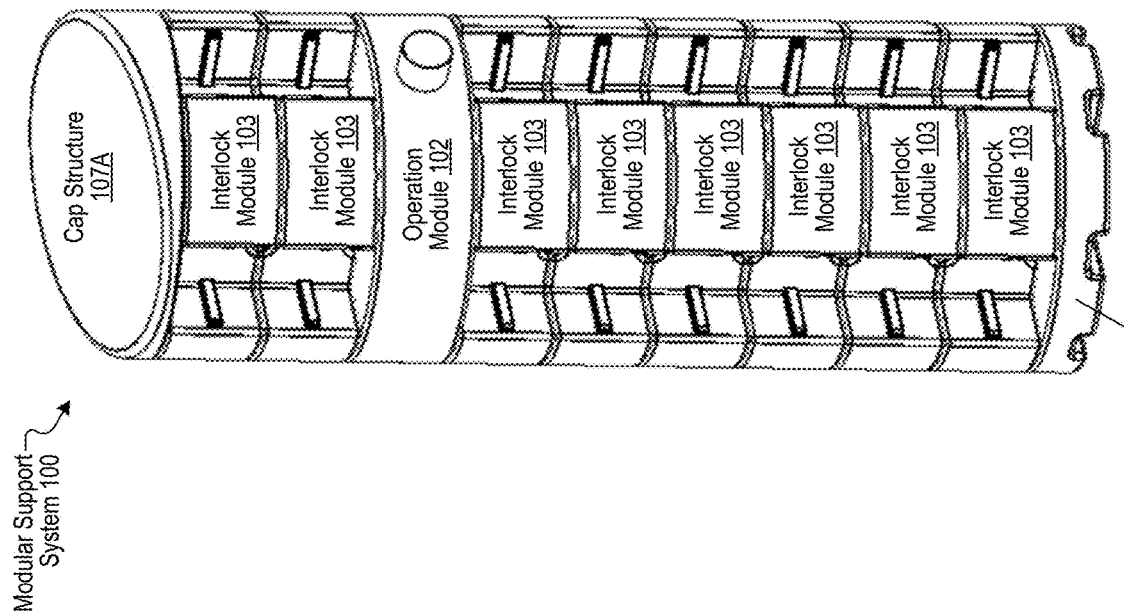

FIGS. 1B-D illustrate modular support systems 100, according to certain embodiments. FIG. 1B illustrates the modular support system 200 with operation modules 102 and interlocking modules 103 installed. FIG. 1C illustrates the modular support system 200 with interlocking modules 103 (without one or more operating modules 102). FIG. 1D illustrates the modular support system 200 with operation modules 102 (without interlocking modules 103).

Figures 5A, 5B, 5C:
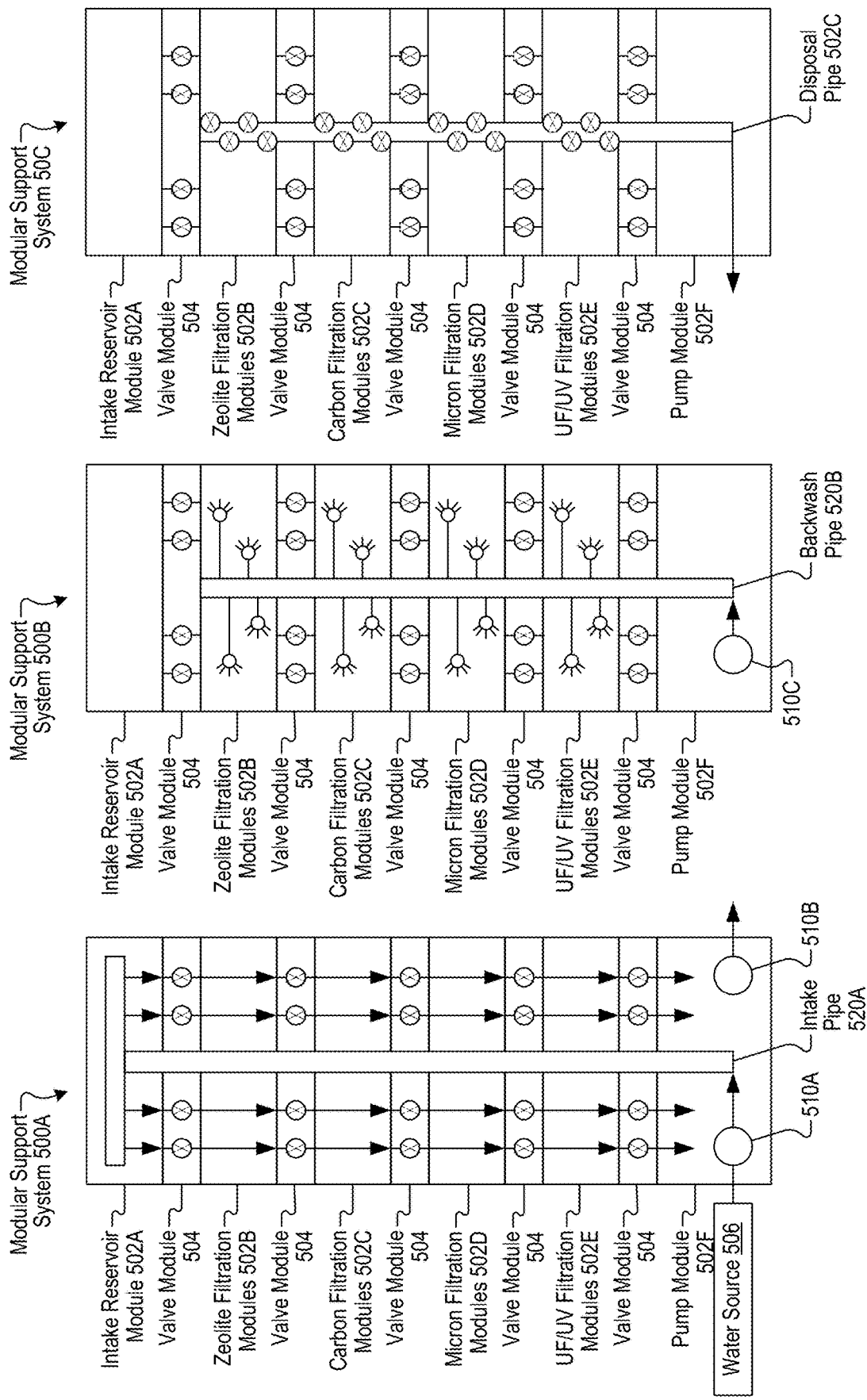
FIGS. 5A-C illustrate modular support systems, according to certain embodiments.
Figure 6A:
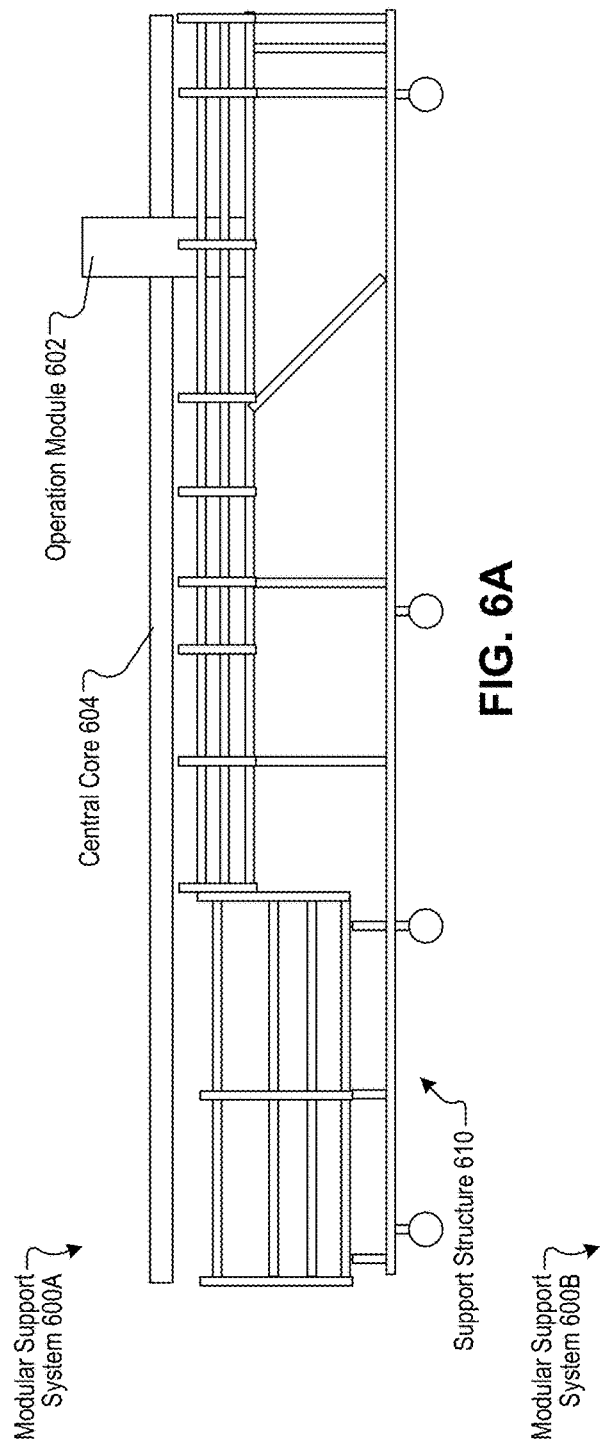
FIGS. 6A-B illustrate assembly of a modular support system, according to certain embodiments.

The modular support system 100 includes a central core (e.g., see central core 604 of FIG. 6A). In some embodiments, central core is a cylindrical tower structure. In some embodiments, the central core includes a pipe (e.g., made of high density polyethylene (HDPE)). In some embodiments, one or more pipes (e.g., intake pipe 520A of FIG. 5A, backwash pipe 520B of FIG. 5B, disposal pipe 502C of FIG. 5C, etc.), electrical conduits (e.g., cables to transfer energy from solar panel structures 105 to one or more devices 104, such as inverter, charge converter, batteries, etc.), control wiring (e.g., between the control boxes 111 of operation modules 102 and a control module 108), and or the like.

Operation modules 102 are arranged radially around the central core. Operation module 102 includes an enclosure structure that forms an interior volume. The enclosure structure includes an upper wall, a lower wall (e.g., opposite the upper wall), a rear wall, a first sidewall, and a second sidewall (e.g., opposite the first sidewall). In some embodiments, the enclosure structure includes a cover (e.g., opposite the rear wall) that couples with one or more of the upper wall, lower wall, first sidewall, and/or second sidewall. In some embodiments, an operation module houses a device 104 that is associated with one or more of water treatment, generating electricity, or communication. In some embodiments, operation module 102 includes a control box 111 (e.g., processing device, common control box) that interfaces with the device 104 located in the operation module 102 and controls function of the device 104, monitors status and performance of the device 104, transmits data to the control module 108 of the modular support system 100, and receives instructions from the control module 108. In some embodiments, operation module 102 includes an electrical interconnect that electrically couples the device 104 to the central core through the rear wall of the enclosure structure of the operation module 102.

In some embodiments, interlock modules 103 are arranged radially around the central core. In some embodiments, the interlock modules 103 form recesses that have features (e.g., recesses, protrusions) that align with features (e.g., protrusions, recesses) of the sidewalls of operation modules 102 to allow operation modules 102 to slide into recesses of interlock modules 103 (e.g., so that the operation modules 102 are supported by the interlock modules 103). In some embodiments, an operating module 102 (e.g., operation module attached to solar panel structures 105) is a ring that fits around the central core and is disposed under and/or above interlock modules 103. In some embodiments, the operation module 102 attached to solar panel structures 105 is located proximate a center of gravity of the modular support system 100. In some embodiments, an interlock module 103 forms an interior volume where one or more devices 104 (e.g., batteries) can be stored.

In some embodiments, the interlock modules 103 form multiple recesses (e.g., four recesses), where each recess is configured to receive an operation module 102. The recesses of the interlock modules 103 align with each other to form columns of operation modules 102 (e.g., four columns of operation modules 102). In some embodiments, the operation modules 102 form openings (e.g., holes, channels, ports, etc.) that align with each other (e.g., to allow fluid connection between operation modules 102, to provide electrical coupling between operation modules 102, etc.)

In some embodiments, an operation module 102 is substantially a same height as an interlock module 103. In some embodiments, an operation module 102 has a height that is approximately a multiple (e.g., an integer multiple) of the height of an interlock module 103. In some embodiments, an operation module 102 is approximately the same height as multiple (e.g., two, three) interlock modules 103 and has features (e.g., protrusions, recesses) that allow the operation module 102 to be inserted into the recesses of the interlock modules 103 and attach to the interlock modules 103.

In some embodiments, each of one or more of operation modules 102, interlock modules 103, and/or modules 109 include a corresponding enclosure structure that forms an interior volume (e.g., to store one or more components, such as devices 104, water treatment media, etc.). In some embodiments, one or more modules (e.g., operation modules 102, interlock modules 103, and/or modules 109) cause the base of the modular support system 100 to be larger (e.g., have a larger diameter, have a greater weight, have one or more outer surfaces that are a greater distance from the central core than the outer surfaces of an upper portion of the modular support system 100) than an upper portion of the modular support system 100.

In some embodiments, the modular support system includes one or more cap structures 107. In some embodiments, one or more of the cap structures 107 are an operation module 102. In some embodiments, a first distal end of the central core is disposed proximate (e.g., attaches to) cap structure 107A and a second distal end of the central core is disposed proximate (e.g., attaches to cap structure 107B. In some embodiments, cap structure 107A is located at the top of the modular support system 100 (e.g., proximate the upper distal end of the central core). In some embodiments, the cap structure 107A receives the water to be treated via an intake pipe (e.g., intake pipe 520A of FIG. 5A) that is routed through the central core. In some embodiments, the cap structure 107A houses a device 104 used for communication (e.g., antenna, radio device, transmitter, receiver, cellular module, etc.).

In some embodiments, cap structure 107B (e.g., base, base unit) is located at the bottom of the modular support system 100 (e.g., proximate the lower distal end of the central core). In some embodiments, the cap structure 107B receives and stores treated water to be provided for water usage (e.g., and backwash operations via a backwash pipe 520B of FIG. 5B that is routed through the central core). In some embodiments, the cap structure 107B is a base of the modular support system 100 that includes one or more protrusions to be inserted in the ground to install the modular support system 100 in a location.

The modular support system 100 is a modular structure capable of being outfitted for different missions. In some embodiments, the modular support system 100 is a vertical cylindrical tower structure (e.g., having a height of approximately 20 feet above the ground, built of composite and recycled plastic materials). The modular support system 100 includes unique molded pieces (e.g., central core, operation module 102, interlock module 103, module 109) assembled and interlocked with each other forming the superstructure of the modular support system 100. One or more devices 104, such as solar panels, water pumps, water treatment systems (e.g., filtration systems), energy storage devices (e.g., battery banks), and communication equipment are contained within and/or attached to the unique molded pieces. In some embodiments, when fully assembled, the modular support system 100 weighs approximately 5,000 pounds (lbs) dry-weight and is shipped with onboard batteries fully charged.

The modular support system 100 has an adaptable flexible architecture making the modular support system 100 a sustainable solution. In some embodiments, the modular support system 100 has a long lifespan with periodic maintenance (e.g., every 12 months). In some embodiments, the modular support system 100 is designed for little to no maintenance.

The modular support system 100 can use field-proven components for water treatment (e.g., filtering) and pumping systems. Communication systems (e.g., communication device 104, etc.) of the modular support system 100 are configured to be adapted to client needs. In some embodiments, satellite systems are used for most remote locations, cellular modules are used where available, and direct hook up to area networks and local grid is also possible.

In some embodiments, internal pumps of the modular support system 100 pump water from a local water source to a reservoir (e.g., cap structure 107A, operation module 102) at or proximate the top of the modular support system 100 and the modular support system 100 releases (e.g., gradually releases, controllably releases via valves) the water through automated ports within the reservoir. Water passes through each water treatment module (e.g., filter module) below the intake reservoir and is then stored in the base (e.g., cap structure 107B, operation module 102). In some embodiments, the modular support system 100 is capable of treating (e.g., filtering) in excess of 2,000 gallons of water per day. Water treatment can take place day and night to meet demand. In some embodiments, the modular support system 100 can draw and treat water from any body of water or well.

In some embodiments, the modular support system 100 is shipped fully assembled and ready to run. In some embodiments, the modular support system 100 is placed in a standard shipping container for delivery by water, land, or air to arrive onsite (e.g., on an assembly and deployment platform, on support structure 610 of FIGS. 6A-B).

Within a few hours of deployment (e.g., and the press of a button by a technician), the modular support system 100 is raised into position and then the modular support system 100 is initiated via user input (e.g., via touch panel computer interface on the base of the modular support system 100).

The modular support system 100 provides numerous methods for delivery of water and power including direct distribution from the modular support system 100 or by creating adjacent pumped storage and/or adjacent power storage.

In some embodiments, communication networks are established between modular support systems 100 over wide areas (e.g., to provide direct phone and network communication to local communities and/or first responders). The modular support system 100 can run independently on its own power source and/or can be connected to an existing power source for supplemental operation. Multiple modular support systems 100 can be joined together forming networks of water, power, and communication transmission.

In some embodiments, the modular support system 100 is composed of rotationally molded hollow plastic pieces (e.g., operation modules 102, interlock modules 103, modules 109) that are arranged to interlock with each other and to form a vertical tower. Within the tower, multiple (e.g., four) distinct vertical columns are formed that include operation modules 102 (e.g., mission packs) and interlocking modules 103. The modular support system 100 is modular (e.g., completely modular) in that the operation modules 102 in the columns are interchangeable with each other. In some embodiments, two or more of the operation modules 102 (e.g., all of the operation modules) have a substantially identical enclosure structure to fit within interlock modules 103 that form a common plastic molded support structure.

The support structures (e.g., interlock modules 103) allow a uniformity in construction and makes the modular support system 100 mass producible. Using molded plastic pieces allows for variations in color, material properties, and material function. This unique variability allows the modular support system 100 to be configured in different ways around a common substructure (e.g., central core, interlock modules 103.).

Performance of the modular support system 100 while deployed in the field can be upgraded and enhanced significantly with new operation modules 102.

In some embodiments, each of the operation modules 102 is equipped with communications, power, and self-diagnostic monitoring ability (e.g., creating a "Smart Mission Pack," having a control box 111 that communicates with the control module 108 of the modular support system 100). Operation modules 102 that are placed in the columns are all digitally tagged (e.g., with RFID tags, with NFC tags) so that the control module 108 (e.g., operating system) of the modular support system 100 can determine information 164 including how the modular support system 100 is configured, what properties individual operation modules 102 have, and functions (e.g., capabilities) of individual operation modules 102.

Operation modules 102 have a unique taper and groove locking feature that allows the operation modules 102 to mate with interlock modules 103 and/or other operation modules 102. The operation modules 102 and interlock modules are arranged radially about a central core (e.g., constructed of HDPE pipe). Individual operation modules 102 can stack forming independent columns for use as a water storage, power storage, and/or communications equipment hub.

Operation modules 102 are molded plastic pieces including one or more of metallic inserts, molded passageways, and metal plates (e.g., aluminum plates) affixed to the metallic inserts that are molded into each operation module 102. In some examples, the upper wall includes an upper metal plate enclosed in first plastic, the lower wall includes a lower metal plate enclosed in second plastic, and one or more of the rear wall, first sidewall, or the second sidewall include one or more metal inserts enclosed in third plastic, where the metal inserts couple the upper metal plate to the lower metal plate. Each operation module 102 is customized to support a function within operations, power, water, or communications requirements of the modular support system 100. In some embodiments, holes are drilled in the metal plates to mount the operation module 102 and to align with and mount various types of devices 104 to the operation module 102. The operation module 102 can include one or more devices 104, such as: pump; motor; battery; circuit board; inverter; charge controller; flow sensor; UF device; UV device; radio transmitter; power source; fuel cell; water quality sensors; camera; microphones; radar unit; liquid bladder; granular material; RFI shielding; EMI shielding; radiation shielding; transmission and reception antennas; microwave transmitters and receivers; weather instrumentation; target acquisition device; sonar device; Lidar device; identification strobes; light digital (e.g., light emitting diode (LED)) display; processing device (e.g., computer apparatus, control module 108, control box 111, computing system 1100 of FIG. 11); and/or the like.

Each operation module has a control box 111 that fits into the recess molded into the outside back face of the operation module 102 and interfaces with the one or more devices 104 inside the operation module 102. In some embodiments, the control box 111 is enclosed in molded plastic and controls functioning of the operation module 102 and monitors status and performance of the operation module 102. Information from the control box 111 feeds back through the superstructure (e.g., cables routed through the central core) of the modular support system 100 to an operation module 102 containing the control module 108 (e.g., computer with software that operates the modular support system 100). In some embodiments, one or more of the control boxes 111 communicate wirelessly with the control module 108 of the modular support system 100. In some embodiments, two or more of the control boxes 111 communicate with each other. In some embodiments, a control box 111 controls operations of one or more other operation modules 102 (e.g., by sending instructions to control boxes 111 of one or more operation modules 102).

The operation modules 102 allow the modular support system 100 to perform multiple functions. In some embodiments, the modular support system 100 is configured to provide power, clean water, and communications to rural and remote areas. The modular support system 100 can generate energy through solar, wind, and/or water sources. The modular support system 100 can provide modular water treatment (e.g., filtration).

Some operation modules 102 are configured to filter out multiple types of water contamination by include one or more of granular media, filter media, chemical treatments, and/or light sources.

In some embodiments, retractable flexible solar panels are mounted on the outside face of the modular support system 100 and are used to capture energy from the sun for storage in specially designed battery modules integral or external to the modular support system 100. In some embodiments, the modular support system 100 utilizes power storage in operation modules 102 containing batteries. In some embodiments, the batteries run the onboard water treatment (e.g., filtration) and water pumping systems.

In some embodiments, the modular support systems 100 become a community hub providing a communications operation module 102 allowing not only the modular support system 100 to communicate with components within the modular support system 100 and also locally with other modular support systems 100 and regionally through radio and cellular networks with international communications and data transfer through satellite systems.

Sensors onboard the modular support system 100 can provide real-time monitoring of water quality, pumping, and water treatment (e.g., filtering) operations.

In some embodiments, the modular support system 100 is configured to be rapidly deployed in remote areas and disaster sites where there is a rough ground surface and limited space to deploy. The modular support system 100 has a vertical design to limit the base footprint (e.g., a base footprint with a width or diameter of about 3.6 feet (ft) or less and a corresponding height of about 20 ft or less, a width that is less than about ⅙ the height of the modular support system, etc.). The small footprint allows more modular support systems 100 and equipment to be deployed to an area where conventional equipment would not fit. The small footprint of the modular support system 100 allows the modular support system 100 to be installed closer to where the modular support system 100 is needed (e.g., closer to where water, power, and/or communications are to be used) which reduces the amount of time to render aid. In some embodiments, the modular support system 100 is fully assembled when deployed and is an instant-on device. Instant-on refers to the modular support system 100 being configured to turn on upon user input (e.g., when an operator hits the power button) which facilitates a sequence within water, power, and communications operation modules 102. In some embodiments, the modular support system 100 is configured to provide rapid support and does not have lengthy setup procedures or time to set up.

In some embodiments, the modular support system 100 is specifically designed and built with instant-on capability at the factory. Batteries and water treatment media (e.g., filter media) are fully charged and all equipment to operate the modular support system 100 is prepared for immediate use (e.g., pumps are self-priming, suction hoses are contained with the modular support system 100 ready to draw water, solar panel structures 105 expand and position themselves at startup of the modular support system 100). The modular support system 100 is configured to be transported in standard shipping containers or on a flatbed truck. The modular support system 100 is offloaded into a vertical orientation for activation by a deployment jig. In some embodiments, a truck-mounted rail system is used for transporting the modular support system 100 (e.g., in standard 40 ft shipping containers) to installation onsite.

The modular support system 100 is a fully self-contained unit and does not need preparation to begin operation. Setup operations are programmed into the control module 108 (e.g., operating system) and may include unfurling the solar panel structures 105 and antennas or integrating with existing infrastructure power, water, etc. The control module 108 synchronizes (e.g., onboard computer synchronizes the operating systems onboard the modular support system 100) with servers (e.g., predictive system 130, predictive server 132, client device 136, regional and international control centers, etc.) to allow real-time monitoring of site operations.

In some embodiments, multiple modular support systems 100 are linked in a geographical area providing combined resources to a central location (e.g., hub). The modular support systems 100 can be connected virtually through one or more wireless communication technologies, such as include Bluetooth®, Wi-Fi®, or radio transmissions. The control module 108 (e.g., standard onboard operating system) allows integration of multiple modular support systems 100. In some embodiments, each modular support system 100 is specialized for a corresponding function and by pooling resources through one or more control modules 108 so that a set of modular support systems 100 function more efficiently.

Each modular support system 100 is calibrated for a corresponding deployment location. While the outward appearance of each modular support system 100 can be standardized using molded plastic pieces and structural elements, the internal hardware and/or payload of each modular support system 100 can be different.

The modular support system 100 has multiple vertical paths for water treatment through the operation modules 102 of the modular support system 100. At each level of the modular support system 100, a corresponding operation module 102 can provide a different type of water treatment (e.g., filtration).

Multiple operation modules 102 can be arranged to form a modular support system 100 that could be dedicated to the collection, purification, and distribution of water and another modular support system 100 that looks identical could be configured to provide wide area communication or power generation.

In some embodiments, the modular support system 100 includes one or more charging stations for charging one or more components (e.g., via one or more batteries). In some embodiments, the modular support system 100 includes one or more charging mats that provide wireless transmission of power to a vehicle (e.g., the charging mat is stored in an operation module 102, the charging mat is removed form an operation module 102 and placed on the ground for a vehicle to drive over and then be charged). In some examples, a military version of the modular support system 100 provides caches for warfighters charging batteries, etc. In some embodiments, the modular support system 100 provides wide area surveillance and secure communications for military units in remote areas. In some embodiments, the modular support system 100 for military units mounts ruggedized electronics and equipment. In some embodiments, the modular support system 100 provides drone recharge stations in remote locations.

In some embodiments, the power to operate the onboard systems (e.g., operation modules 102, devices 104, sensors 106, control boxes 111, control module 108, etc.) is provided by the solar panel structures 105 and stored in battery operation modules 102 (e.g., mounted within interlocking modules 103 in the base (proximate or including the cap structure 107B) of the modular support system 100).

In some embodiments, multiple water treatment operation modules 102 are stacked vertically and are configured to collect, treat (e.g., filter), store, and distribute water. The operation modules 102 provide for water treatment in the modular support system 100 and the flow of water between each level (e.g., operation module 102) is monitored (e.g., by sensors 106) and is provided via gravity. The modular support system 100 (e.g., tower) can be segmented radially (e.g., operations of four columns) and vertically (e.g., number of stacked water treatment operation modules 102) depending on client requirements into one or more pump operation modules 102, one or more filtering operation modules 102, and one or more storage compartments (e.g., operation module 102 or module 109). Each operation module 102 can contain piping, a pumping system, and/or a valve system for distribution of water. The operation module 102 can tap into different types of water sources, such as a river, lake, underground water supply, and/or the like. The modular support system 100 is powered either by an external power source or through a connection within the modular support system 100 to a power operation module 102 (e.g., operation module 102 housing one or more batteries). Along with treatment (e.g., filtration) of water, the cleaning, collection, and disposal of waste generated during the water treatment (e.g., water filtration) process is achieved through onboard-self-cleaning backwash systems utilizing air, water, and/or mechanical operations.

The operation modules 102 allow for automatic optimization of flow through the modular support system 100. Internal baffles within an operation module 102 can slow or speed up flow (e.g., responsive to being controlled by control box 111 or control module 108) depending on the demand for water. This optimizes power usage of the modular support system 100 and tunes performance of components of the modular support system 100 to demands at the deployment site.

The communications to and from the modular support system 100 are part of the operations of the modular support system 100. Water quality and water usage can be monitored regionally and globally. Onboard sensors (e.g., sensors 106) collect data in real time locally on the operation and performance of the modular support system 100 and provides the data to remote monitoring stations (e.g., predictive system 130, predictive server 132, client device 136, etc.). Radio, satellite, cellular, and/or local area network systems can be mounted in individual operation modules 102 that are powered either by an external power source or through a connection within the modular support system 100 to a power operation module 102 (e.g., operation module 102 that houses one or more batteries).

The modular support system 100 provides rapid new contamination detection, identification, and treatment. When a water source is tapped to supply a local population, there may or may not be testing done of that water to determine water quality and water safety. Conventionally, wells are sunk and until livestock or people start getting sick from contaminated water, the well is then shut down and another fresh well is started (e.g., drilled), leaving the contamination behind, which can be avoided by using the modular support system 100.

The modular support system 100 performs active monitoring and treatment. A baseline is developed for the water in the area of operations that is to be treated (e.g., based on water quality data) and then the modular support system 100 is deployed with operation modules 102 (e.g., selected based on the water quality data) that counter the contaminant by removing the contaminant and providing clean water, making the water source sustainable which can save time, resources, energy, and cost of a community by not having to dig additional wells or move a community to find fresh water This allows a community to stay focused in a particular area to be able to grow and develop.

In some embodiments, the modular support system 100 uses (e.g., includes) a sensor network (e.g., a Libelium Waspmote Smart Water Extreme sensor network, sensors controlled by the control module 108) which is capable of operating multiple water quality sensors (e.g., sensors 106). The collected sensor data is then passed through the control module 108 (e.g., running Waterhound software) to identify contaminants present in the water in real time (e.g., by comparing the sensor data against a database of contaminants, such as Waterhound database of 3,000 contaminants).

If a new contaminant is detected by the control module 108 of the modular support system 100, the control module 108 would perform a corrective action (e.g., the Waterhound software running on the control module 108 would warn the operating system of the control module 108 which would then shut down the water filtering column). In some embodiments, the control module 108 provides an alert to a local operator and/or servicing agent that a new contaminant is present in the water currently being treated, that the new contaminant is not treated by the current operation modules, and that the modular support system 100 has halted water treatment. In some embodiments, the control module 108 (e.g., running the Waterhound software) provides an alert indicating a type of one or more operation modules 102 to use to remove the new contaminant to be able to resume water treatment operations. Responsive to the existing one or more operation modules 102 being replaced (e.g., by a service technician onsite) based on the alert to treat the new contaminant, the control module 108 detects and identifies the new one or more operation modules 102 that were installed, confirms that the new one or more operation modules 102 are configured to provide a correct treatment method (e.g., to treat the new contaminant), and resumes the water treatment operations of the modular support system 100. The modular support system 100 allows for rapid detection, identification, and implementation of a treatment solution within a very short period of time to keep the modular support system 100 operating (e.g., keep water treatment operating).

In some embodiments, one or more operation modules 102 have approximately double the volume (e.g., approximately double the height) or approximately triple the volume (e.g., approximately triple the height) of a single operation module 102. These operation modules 102 are configured to hold larger and longer pieces of equipment (e.g., devices 104) and have the same interconnection and ability to stack within an existing column of a modular support system 100.

The larger operation modules 102 fit within the existing interconnect modules 103, taking up additional spaces in a column. A single-height operation module 102 can be disposed on top of a double-height operation module 102 that is disposed on a triple-height operation module 102. This allows for more unique combinations of packs and customization of the modular support system 100 in the field for evolving mission requirements. The different sized operation modules 102 swap in and out of the modular support system 100 in the same way that single operation modules 102 are swapped in and out. The larger-sized operation modules 102 may include the same control boxes 111, mounting plates, and metallic inserts as other operation modules 102.

In some embodiments, interconnect modules 103 include dummy modules (e.g., operation modules 102 that do not include any devices 104, sensors 106, control box 111, etc.) designed as spacers between operation modules 102 in vertical column to provide additional space for storage and equipment within the modular support system 100. A passthrough (e.g., a conduit, a pipe, openings, channel, etc.) built into the dummy module allow the passage of power, water, and/or communication lines.

In some embodiments, the modular support systems 100 are configured in many ways depending on client requirements. The modular support system 100 can be reconfigured in the field to increase or alter capability of the modular support system 100 rapidly. Power operation modules 102 can be added to increase power output. Water operation modules 102 can be added to increase water storage and/or filtering capacity. If water contaminants change over time, the system can detect that change and then alternate operation modules 102 can be inserted into the column of the modular support system 100 to change performance eliminating the new contaminants.

The modular nature of the modular support system 100 allows the modular support systems 100 to be mass produced and because of the repeatability, production costs can be kept low. The modular nature of the modular support system 100 also allows for rapid reconfiguration where only the internal structures of the operation modules 102 are changed and the structure and mounting systems (e.g., interlock modules 103, central core, cap structures 107, solar panel structures 105, etc.) of the operation modules 102 are identical so that field operations to augment or replace operation modules 102 can be done rapidly with minimal training.

In some embodiments, a filtering column carousel operation is used (e.g., using one column for a period of time and then a different column for a period of time). In some embodiments, a single filtering column of operation modules 102 can filter approximately 2,000 gallons of water per day and operate for a year continuously (e.g., without replacement of water treatment media, without maintenance, etc.). At the end of the year, the column of operation modules 102 is to undergo UV lamp replacement and other incidental maintenance to continue water treatment operations. To extend the time between maintenance periods, the modular support system 100 (e.g., control module 108) can continue water treatment operation (e.g., without performing maintenance, without replacing components) by switching operations to a different water treatment column (e.g., the water treatment column adjacent to the one shutting down). This process can be repeated three times, at which point the modular support system 100 will have been operating onsite for 4 years with no maintenance required.

In some embodiments, a serpentine filtering column arrangement may be used (e.g., the same water being treated by multiple columns). For removal of contaminants that may require enhanced removal and treatment techniques, operation modules 102 may be arranged in unique patterns. Water to be treated can flow through one column, exit the bottom of the column to be pumped to the top of the next column (e.g., adjacent column) to be further treated by that column. This can be repeated by flowing through columns (e.g., different columns, the same column, around the entire circumference of the modular support system 100, all four columns of operation modules 102, etc.) for treatment of the water. An entire column of operation modules 102 can be devoted to a single type of water treatment method and then the water can be released to the next column for a different type of one or more treatments. This is repeated until the treatment is completed. In some embodiments, if more than four columns of treatment are required, output from the last column can be directed to another modular support system 100 where up to four more water treatment process can be run. This processes can be repeated over and over offering unlimited number of processes. After completing operations like this, operation modules 102 could be returned to a standard configuration where individual columns perform standard treatment functions (e.g., only one column of water treatment operations, the same water is treated by just one column).

In some embodiments, the modular support system 100 has a one or more soil anchors (e.g., penetrators, protrusions that enter a mounting surface). In some embodiments, the modular support system 100 is to be anchored in certain locations via the base module (e.g., cap structure 107B) that has one or more protrusions (e.g., base module outfitted with a tapered conical shaped penetrator). Through the weight of the modular support system 100 and method of deployment (e.g., via an actuator of the jig, via aerial deployment, etc.), the anchor penetrates the soil beneath the modular support system 100 to secure the modular support system 100. During air drops and helicopter insertions, the weight of the modular support system 100 buries the penetrator in the soil, creating a stable foundation for the modular support system 100. Multiple penetrator heat types can be used, optimizing the penetrator for one or more of sand, clay, gravel, and/or ice.

The control module 108 of the modular support system 100 executes a computer operating system that allows communication and monitoring between operation modules 102. The operating system monitors performance of each of the operation modules 102 and maintains efficiency of the modular support system 100 over the course of deployment of the modular support system 100. The modular support system 100 can be monitored and operated locally (e.g., by control module 108) and/or remotely (e.g., by control module 108 sending data to predictive system 130, predictive server 132, client device 136, and/or the like). The control module 108 (e.g., executing the operating system) can link multiple modular support systems 100 together and cause resources to be distributed between users of the modular support systems 100. The control module 108 collects data (e.g., sensor data 142) and provides real-time performance information to the operator.

In some examples, the modular support system 100 is deployed to a remote village and draws contaminated water from a well. The water is filtered by the modular support system 100 and delivered as potable to the people in the village as needed.

After about 6 months of deployment, the control module 108 detects a new contaminant in the water supply based on sensor data from sensors 106 (e.g., water quality sensors) of the modular support system 100 and completes a shutdown of the filtering column. The control module 108 provides an alert indicating the new contaminant to a local representative who provides a new operation module 102 that treats or removes the contaminant.

The replacement of the module can be provided locally by the consumers or by qualified maintenance personnel. Because each operation module 102 is a smart module (e.g., has a control box 111 with a processing device) and has a unique identifier 162 (e.g., corresponding to information 164 including functionality of the operating module 102), the control module 108 identifies when an operation module 102 is removed and what type of operation module 102 is inserted to replace the removed operation module 102, allowing the control module 108 to determine that the appropriate operation module 102 (e.g., the appropriate filter) is in place to resume treating water.

Various types of modular support systems 100 can be used.

In some embodiments, floating point absorber pumps and flexible hoses (e.g., coupled to an operation module 102, an "octopus mission pack") combined with the modular support system 100 equipped with reverse osmosis (RO) operation modules 102 intake salt-water from the sea and discharge brine back into the ocean. During natural disasters in coastal areas, potable water supplies of communities or cities can be cut off. The modular support systems 100 can be deployed near a shoreline, flexible hoses (e.g., two flexible hoses) with attached cylindrical point absorber buoys can be unfurled (e.g., from an operation module 102 to a body of water). In some embodiments, a first buoy includes a pump that ingests and pumps saltwater to the modular support system 100 on the shore and a second buoy is a discharge point for brine after the saltwater is treated with the one or more RO operation modules 102 mounted on the modular support system 100.

In some embodiments, the modular support system 100 used by the military has the designation "Dagger." Military modular support systems 100 may be rapidly deployed and can be carried in aircraft and fitted with a parachute system to allow the modular support systems 100 to be deployed in remote areas. The modular support systems 100 deployed aerially are weighted to land in a vertical orientation and can mount a soil penetrator to facilitate proper deployment (e.g., installation). The modular support systems 100 are ruggedized for military operations with unique internal and external structures.

In some embodiments, the modular support system 100 (e.g., a "Firebreak" modular support system 100) is used to provide fire team support in remote locations stopping forest fires. The modular support system 100 is capable of being deployed by air and placed in grids at fixed points by GPS. The modular support systems 100 can create wet lines as opposed to current dry line forest fire fighting techniques. The modular support system 100 is equipped with water misting systems and water monitors to spray hot spots in a fire line. The modular support system 100 can provide power generation, surveillance, communications, equipment storage, and potable water for smokejumpers deployed to remote locations.

In some embodiments, the modular support system 100 (e.g., "Trident" modular support system 100) provides an in-water platform for power generation, surveillance, communication, and water treatment in remote water locations. The modular support system 100 can be deployed with power generation, water treatment, and communications gear fully integrated providing a unique capability in the air. Modular building blocks (e.g., operation modules 102) allow integration of many types of operation modules 102. Instead of having a pipe oriented from the operation module 102 (e.g., housing an intake pump) the water can be drawn into the modular support system 100 via a port on the operation module that is submerged in the water source.

In some embodiments, the modular support system 100 (e.g., "Triage" modular support system 100) is rapidly deployed with first responders to disaster sites to provide emergency equipment, power, water, and communications capabilities on the scene of natural disasters and locations of other emergency events. The modular building blocks (e.g., operation modules 102) allow storage and integration of many types of operation modules 102.

In some embodiments, materials available for use in rotational molding processes are varied and can provide unique capabilities in the standard structure of the modular support system 100 and variations in structure of the modular support system 100. Some additives increase the strength of materials which may allow the operation modules to support heavy equipment or heavy filtration material (e.g., heavy granular materials). In some embodiments, one or more components and one or more operation modules 102 of the modular support system 100 can have a different material property so that the modular support system 100 can be optimized for a given mission (e.g., location, functionality, way of deployment, etc.). One or more operation modules 102 can be fireproof, fire resistant, buoyant, and/or flexible. Sensitive electronic equipment (e.g., devices 104 in operation modules 102) can be shielded (e.g., with copper additives, RFI shielding, EMI shielding, etc.). Anti-bacterial additives can be added to the plastic reservoir (e.g., operation module 102, cap structure 107, module 109, etc.) to improve quality of stored water.

In some embodiments, different configurations of filtering technology are possible for the modular support system 100. One example of water treatment levels of the modular support system 100 is shown in Table 1.

TABLE 1

| Level of Treatment | Result of Treatment | Filter Examples |
| --- | --- | --- |
| Intake hose with strainer/filter bag and pump brings water into modular support system 100 through pump at base of | Large particles and debris filtered out by strainer/ filter bag on hose | Rotorflush strainer/filter bag; self-cleaning filter; inlet filter; filter to protect pump |

TABLE 1-continued

| Level of Treatment | Result of Treatment | Filter Examples |
| --- | --- | --- |
| modular support system 100 and delivers to reservoir at top of unit (e.g., cap structure 107A) | | |
| Reservoir distributes water to one to four treatment columns within trunk Reservoir outputs have strainers. | Large particles and debris filtered out by strainers | Used for sieving water |
| $1^{st}$ Level under reservoir contains zeolite media | Used to remove turbidity, this layer employs backwashing and possible aeration for cleaning or have a replacement plan | Loose zeolite media or zeolite foam |
| $2^{nd}$ Level contains activated carbon media with mesh filter at base. | Removes sediment and volatile organic compounds (VOCs). Helps with taste of water and removal of chlorine. | Charcoal foam; activated charcoal |
| $3^{rd}$ Level uses a fine particulate filter | Has backwash cleaning, mechanical wiper, or replacement plan | 10-15 micron filter |
| $4^{th}$ Level is a reservoir which pumps water through a combined UF and UV treatment stage | UF gets rid of microbes and UV disables bacteria. UF has a backwash system or a replacement plan. | Forcing water at pressures (e.g., up to several atmospheres) through membranes |
| Water cistern at base contains UV lights. | Disinfects water, disables bacteria's ability to multiply. | |

Other examples of configurations with more, less, or different levels of filtering may be used.

Referring to FIG. 1C, cap structures 107A-B, interlock modules 103, and one or more operation modules 102 (e.g., that form a ring around the central core, operation module 102 configured to couple to one or more solar panel structures 105) are arranged around the central core. Operation modules 102, solar panel structures 105, and/or modules 109 are then installed.

FIG. 1D illustrates columns of operation modules 102. A column of operation modules 102 refers to two or more operation modules 102 that are aligned vertically (e.g., one above the other). In some embodiments, an entire column of operation modules 102 is used to perform an operation (e.g., water treatment, electricity storage, communication). In some embodiments, one or more first operation modules 102 in a column are used to perform a first operation (e.g., water treatment) and one or more second operation modules 102 in the same column are used to perform a second operation (e.g., energy storage) that is different from the first operation. For example, in FIG. 1D, the same column has an operation module 102 that includes a device 104A (e.g., pump) and an operation module 102 that includes devices 104B (e.g., batteries) that are different from device 104A.

FIGS. 2A-F illustrate operation modules 202 (e.g., operation modules 102 of FIGS. 1A-D) of a modular support system (e.g., modular support system 100 of FIGS. 1A-D), according to certain embodiments.

FIGS. 2A-D illustrate an operation module 202A configured to interconnect with an interlock module 203 (e.g., interlock module 103 of FIGS. 1B-C). The operation module 202A includes an enclosure structure 210 that forms an interior volume 220. The enclosure structure 210 includes an upper wall 212, a lower wall 214, a rear wall 218, sidewalls 216, and a cover 226. The enclosure structure 210 at least partially encloses the interior volume 220. In some embodiments, the sidewalls 216 each have a feature 224 (e.g., recess, protrusion) to interlock with corresponding features 224 formed of the interlock module 203 (e.g., interlock module 103 of FIGS. 1B-C).

In some embodiments, one or more devices (e.g., devices 104 of FIGS. 1A and 1D) are located in the interior volume 220 of the enclosure structure 210. One or more fasteners may secure the device to the enclosure structure 210 (e.g., lower wall 214, rear wall 218, sidewalls 216, etc.). In some embodiments, the fasteners pass through an opening in the enclosure structure 210.

In some embodiments, the enclosure structure 210 forms one or more openings 222. In some embodiments, an electrical interconnect is configured to couple the device to the central core through the rear wall 218 (e.g., through an opening in the rear wall 218). In some embodiments, the electrical interconnect includes a control box 111 attached to the enclosure structure 210. In some embodiments, the operation module 202A includes a blade that extends from an outer surface of the rear wall 218. Responsive to sliding the operation module 202 into the recess 282 of the interlock module 203 (e.g., interlocking the features 224 and 282 together), the blade electrically couples with the central core.

In some embodiments, the rear wall 218 has an opening for the electrical interconnect to couple the device with the control module (e.g., control module 108 of the modular support system 100) for control of the device. In some embodiments, the rear wall 218 has an additional opening for a cable for charging one or more batteries via solar power that interconnects with the central core (e.g., via the control box 111, via an interface in the central core, etc.).

FIGS. 2E-F illustrate an operation module 202B configured to be disposed around the central core (e.g., central core 604 of FIG. 6A) of the modular support system (e.g., modular support system 100 of FIGS. 1A-D). The operation module 202B is configured to be disposed above and/or below one or more interlocking modules 203.

The operation module 202B includes an enclosure structure 210 that forms an interior volume 220. The enclosure structure 210 includes a lower wall 214, a sidewall 216, and a cover 226. The enclosure structure 210 at least partially encloses the interior volume 220. In some embodiments, the sidewalls 216 each have a feature 224 (e.g., recess, protrusion) to interlock with corresponding solar panel structures (e.g., solar panel structures 105 of FIG. 1B, solar panel structures 305 of FIGS. 3A-B, or solar panel structures 305 of FIGS. 3C-D).

The operation module 202B (e.g., lower wall 214 and cover 226) forms one or more openings 222C that align with corresponding openings of other operation modules 202 and/or interlock modules 203 (e.g., to allow water, solar panel cables, communication wires, etc. to pass through the operation module 202B). The operation module 202B (e.g., lower wall 214 and cover 226) forms an opening 222D that aligns with corresponding openings of the interlock modules 203 to receive the central core (e.g., central core 604 of FIG. 6A). In some embodiments, the operation module 202 has an opening that aligns with a corresponding opening in the central core to electrically couple a device in the interior volume 220 of the operation module 202B with the central core (e.g., with the control module 108 of FIG. 1A).

In some embodiments, one or more devices disposed in the interior volume 220 of operation module 202B are associated with operation of the solar panel structures attached to the operation module 202. Devices associated with operation of the solar panel structures include one or more of a motor and/or actuator to position the solar panels based on the solar position, an inverter, a charge controller, one or more batteries, a control box 111, and/or the like. In some embodiments, one or more actuating devices (e.g., gears, motor, linear actuator, etc.) are disposed in the interior volume 220 of the operation module 202B to position the solar panel structures.

FIGS. 2G-H illustrate an interlocking module 203 of a modular support system (e.g., modular support system 100 of FIGS. 1A-D), according to certain embodiments.

The interlocking module 203 includes an enclosure structure 250 that forms an interior volume 270. In some embodiments, one or more devices (e.g., batteries, etc.) are disposed in the interior volume 270. The enclosure structure 250 has an upper wall 252, lower wall, and sidewalls 256. In some embodiments, the enclosure structure 250 includes a cover 226 (e.g., at least a portion of the upper wall 252 is a cover 226). One or more recesses, openings, and channels are formed by the enclosure structure 250. Opening 272D is configured to receive the central core (e.g., central core 604 of FIG. 6A) and aligns with the opening 222D of operation module 202B. Openings 272C aligns with corresponding openings (e.g., openings 222C of operation module 202B, ports, etc.) of operation modules 202 and interlock modules 203 (e.g., to allow water, solar panel cables, communication wires, etc. to pass through the interlock module 203).

The interlock module 203 forms one or more recesses 282 (e.g., four recesses 282) that are each configured to receive an operation module 202A. Sidewalls of the recesses 282 include features 264 (e.g., protrusions, recesses) that are configured to interconnect with features 224 on the sidewalls of the operation modules 202A. In some embodiments, the interconnection of features 224 and 264 support and secure the operation modules 202A in the modular support system.

The interlock module 203 includes one or more channels 280 (e.g., substantially horizontal channel from an outer lateral surface to an inner lateral surface) that are routed from a sidewall 256 to an interior sidewall (e.g., in opening 272D) that aligns with an opening in the central core. The channels 280 allow air to pass through, above, or below the interlock module 203 and through the central core to remove heat from the modular support system. In some embodiments, blades (e.g., a wind turbine blade device) are disposed in one or more of the channels 280 that is configured to rotate (e.g., responsive to wind) to generate energy and to remove heat from the modular support system.

In some embodiments, an operation module 202A inserted in the recess 282 of the interlock module 203 is electrically coupled to the central core via one or more electrical interconnects that pass through, above, or below the interlock module 203 (e.g., through channel 280). In some embodiments, an electrical interconnect passes from the central core and then through, above, or below the interlock module 203 (e.g., through a channel 280) to electrically couple with an operation module 202A responsive to the operation module 202A being inserted in the recess 282 of the interlock module 203. In some embodiments, the operation module 202A has an electrical interconnect (e.g., outlet, metal pad, etc.) disposed on an outer surface of the rear wall 218 that aligns with (e.g., contacts) an electrical interconnect (e.g., outlet, metal pad, etc.) disposed on a face of the recess 282 responsive to the operation module 202A being inserted in the recess 282 (e.g., via interlocking features 224 and features 264).

In some embodiments, the interlock module 203 has an outside face (e.g., sidewall 256) at four points around the circumference of the modular support system. In some embodiments, the face (e.g., sidewall 256) of the interlock module 203 forms a scalloped shape molded into the interlock module 203, creating a depression. In this depression, a tunnel entrance is molded in, leading to a passageway (e.g., channel 280) molded into the interlock module 203. The passageway in the interlock module 203 leads to and butts up against the central core (e.g., HDPE pipe) of the modular support system. The central core forms holes that align with the passageways (e.g., channels 280) coming from each of the four faces of the interlock module 203. In some embodiments, a set of blades (e.g., vertical axis wind turbine (VAWT) blades, wind channeler) is mounted in the depressions of the interlock modules 203 parallel to the vertical face of the modular support structure. The blades are configured to operate in low wind speeds and the vertical orientation causes the blades to take up little space within the footprint of the modular support structure.

In some embodiments, the height of the blades is a little shorter than the height of the interlock module 203 to account for mounting interface and interconnection. The blades are affixed to a plate at an optimal angle to catch the wind. The top of the plate has a shaft that links with a dynamo or to other blade assemblies stacked above and/or other blade assemblies stacked below this set of blades. The dynamo captures the energy from the rotation of the blades and directs the energy through a battery management system (e.g., control module 108) of the modular support system to charge onboard batteries.

The blades are used to remove hot air which may accumulate from the operation of operation modules 202 and/or other components of the modular support system. Each operation modular vents hot air into the central core of the modular support system, the hot air rises through the top of the open central core to the atmosphere. The addition of blades (e.g., wind channelers) aids the release of hot air from the core more rapidly. The shape of the blades funnels cooler air into the passageway (e.g., channel 280) to the central core where cool air drops in and hot air rises and is replaced.

FIGS. 3A-D illustrate solar panel structures 305 (e.g., solar panel structures 305) of modular support systems 300 (e.g., modular support systems 100 of FIGS. 1A-D), according to certain embodiments.

Referring to FIGS. 3A-B, in some embodiments, the solar panel structure 305 includes actuators that lifts the solar panels 310 during use and lowers the solar panels 310 (e.g., to be disposed proximate outer sidewalls of the operation modules and interlock modules.

Referring to FIGS. 3C-D, in some embodiments, the solar panel structure 305 has a folding structure and an actuator 320 that folds the solar panels 310 when not in use and unfolds the solar panels 310 during use. In some embodiments, each solar panel 310 is a retractable flexible solar panel that includes one or more solar elements attached to a fabric that is secured to a folding frame.

In some embodiments, the solar panel structure 305 is referred to as an expanding solar panel apparatus (ESPA). The power for the modular support system 300 is collected by solar panel structures 305. In some embodiments, the solar panels 310 are flexible and lighter (e.g., up to ten times lighter) than conventional rigid solar panels. In some embodiments, the solar panels 310 (e.g., flexible solar panels) are created by affixing solar elements to a fabric (e.g., high tenacity fabric, a sailcloth fabric).

The solar panels 310 that are flexible can be manually folded upon themselves. For the portability and rapid deployment of the modular support system 300, in some embodiments, a flexible lightweight frame is attached to the modular support system 300. The frame controls the unfolding and folding of the solar panels 310 that are flexible and the orientation of the solar panels 310.

The expansion and contraction of the panels is provided by linear actuators 320 combined with a frame (e.g., carbon fiber scissor apparatus) responsive to instruction from the control module (e.g., control module 108, operating system). The frame also rotates horizontally around the axis of the modular support system 300 via a rotating collar driven by a motor and gears (e.g., see operation module 202B of FIGS. 2E-F). The collar (e.g., operation module 202B of FIGS. 2E-F) is mounted around the central core between operation modules (e.g., operation modules 202A of FIGS. 2A-D) and interlock modules (e.g., interlock modules 203 of FIGS. 2G-H). Each arm which attaches to the frame is also free to rotate about a corresponding individual axis to allow the solar panels 310 to track the angle of the sun (e.g., current solar position). The rotation of the frame is controlled by motors built into the collar. The motors are controlled by the control module (e.g., operation system) of the modular support system which receives sensor data from a solar intensity probe and GPS. During inclement weather which is detected (e.g., based on data received by a communication device, based on sensor data, based on an onboard weather station operation module, etc.) and during shipping to the site, the solar panel structure 305 folds and is stored in a lightweight foam cover which encapsulates the solar panels 310 (e.g., folded flexible solar panels) and rests against the outside surface of the modular support system (e.g., as a blister pack).

In some embodiments, the modular support system 300 is configured as a self-contained power generation, power storage, and distribution system. The modular support system 300 can mount solar panels, wind turbines (e.g., blades coupled to interlock modules), and/or a water (e.g., low head river turbine) energy collection system with specific operation modules. The modular support structure stores power in high-capacity battery banks for release through the modular distribution system either directly on the base module or via festooned cables within the unit to the user location. The power operation module provides power to other operation modules in the modular support system to support communication and water treatment operation modules.

FIGS. 4A-G illustrate modular support systems 400, according to certain embodiments. A modular support system 400 can have one or more combinations of operation modules 402. The modular support system 400 can have one or more columns of operation modules. In some examples, each a modular support system 400 has four columns of up to ten operation modules 402 each. Each column has an ordered set of operation modules 402 (e.g., dirty water module on the top, water treatment modules in the below the dirty water module, and a clean water module below the water treatment modules).

Referring to FIG. 4A, in some embodiments, a modular support system 400A includes (e.g., in a column from top to bottom) a communication module 402A (e.g., including a satellite dish), a contaminated water distribution module 402B (e.g., including water quality sensors), four water treatment modules 402C (e.g., water treatment stack, trunk modules, including pressure and/or flow sensors in each water treatment module 402C), a control module 402D, a pump module 402E (e.g., contaminated water input), and a clean water module 402F (e.g., base module, including water quality sensors, including pressure and/or flow sensors, the clean water output). In some embodiments, the communication module 402 is an operation module that has one or more communication devices (e.g., devices 104 of FIGS. 1A and 1D). In some embodiments, the pump module 402E includes one or more pumps (e.g., devices 104 of FIGS. 1A and 1D) that draw water from a water source (e.g., via one or more pipes) and provide the water via a pipe in the central core to the contaminated water distribution module 402B. The water flows from the contaminated water distribution module 402 through the different water treatment modules 402C to the clean water module 402F via actuation of corresponding valves. The control module 402D (e.g., control module 108 of FIGS. 1A-B) controls operation of the different operation modules 402 based on sensor data. In some examples, responsive to determining water level in the clean water module 420F and/or water level in the contaminated water distribution module 402B is below a threshold amount (e.g., based on sensor data from one or more water level sensors), the control module 402D causes the pumps in the pump module 402E to provide water to the contaminated water distribution module 402B. In some examples, responsive to determining water level in the clean water module 420F is below a threshold amount (e.g., based on sensor data from a water level sensor), the control module 402D causes the valves (e.g., remote control valves of modules that facilitate maintenance and control of water filtration) in one or more of modules 402B-C to open to cause the water to be treated pumps and enter the clean water module 402F. Responsive to the control module 402D determining that an operation module 402 is to be repaired, replaced, or provided maintenance, the control module 402D provides an alert via the communication module 402A. In some embodiments, the control module 402D periodically communicates sensor data from the operation modules 402 via the communication module 402A. In some embodiments, the control module 402D performs operations based on data (e.g., instructions) received via the communication module 402A.

Referring to FIG. 4B, in some embodiments, a modular support system 400B includes (e.g., in a column from top to bottom) a communication module 402A, a power transfer module 402G, a solar panel module 402H, modules 402 (e.g., contaminated water distribution module 402B and water treatment modules 402C), control module 402D, battery bank module 402I (e.g., power distribution module), and clean water module 402F. In some embodiments, the solar panel module 402H is attached to solar panel structures and includes one or more devices associated with the solar panel structures (e.g., motor and gears to change orientation of the solar panel structures, etc.). The power transfer module 402G includes an inverter and/or a charge controller. The battery bank module 402I includes batteries that are charged based on energy collected by the solar panel structures. One or more conduits or cables connect the solar panel module 402H, power transfer module 402G, and battery bank module 402I via the central core. The control module 402D is electrically coupled to each of the operation modules 402 via control wiring routed via the central core.

Referring to FIG. 4C, in some embodiments, a modular support system 400C includes (e.g., in a column from top to bottom) a contaminated water distribution module 402B, water treatment modules 402C, control module, pump module 402E, and clean water module 402F.

Referring to FIG. 4D, in some embodiments, a modular support system 400D includes (e.g., in a column from top to bottom) large particulate filter module 402J, fine particulate filter module 402K, UV light module, chemical treatment module 402M, and additional modules 402 (e.g., clean water module 402F, etc.). The different types of water treatment modules can be selected based on sensor data indicating contaminants in the water. Water treatment modules can be added and/or replaced over time based on sensor data indicating contaminants in the water changing over time.

Referring to FIG. 4E, in some embodiments, a modular support system 400E includes (e.g., in a column from top to bottom) a communication module 402A, fine particulate filter module 402k, chemical treatment module 402M, UV light module 402L, battery bank module 402I, communication module 402A, and clean water module 402F.

Referring to FIG. 4F, in some embodiments, a modular support system 400F includes (e.g., in a column from top to bottom) communication modules 402A, chemical treatment module 402M, battery bank module 402I, and clean water module 402F.

Referring to FIG. 4G, in some embodiments, a modular support system 400G includes (e.g., in a column from top to bottom) a communication module 402A, a fine particulate filter module 402K, and a battery bank module 402I.

In some embodiments, a modular support system 400 is configured to be placed in a body of water (e.g., river, ocean, etc.) and includes an aperture in a base module to allow water to enter to be treated. In some embodiments, a modular support system 400 includes one or more apertures (e.g., in the trunk) to allow wind to enter (e.g., for heat removal, for energy generation, etc.).

FIGS. 4A-G illustrate only some configurations of modular support systems 400 (e.g., of different columns of modular support systems 400). A modular support system can be configured and/or updated based on conditions of the installation location of the modular support system 400.

FIGS. 5A-C illustrate modular support systems 500A-C, according to certain embodiments. In some embodiments, a single modular support system 500 can include all or a portion of the features illustrated in FIGS. 5A-C.

A modular support system 500 includes operation modules 502 including one or more of intake reservoir module 502A, zeolite filtration modules 502B, carbon filtration modules 502, micron filtration modules 502D, UF/UV filtration modules 502E, and/or pump module 502F. One or more additional or different operation modules 502 may be used. In some embodiments, the modular support system 500 includes one or more valve modules 504. In some embodiments, the valves (e.g., valve module 504) are integral to a corresponding operation module 502. In some embodiments, the valves (e.g., valves module 504) are separate from the operation module 502.

Referring to FIG. 5A, water is pumped via a pump 510A from a water source 506 to the intake reservoir module 502A. Valves of valve modules 504 are controlled to cause the water to flow from intake reservoir module 502A to different water treatment modules 502 (e.g., one to four columns of water treatment modules 502) to be treated and then to flow to the pump module 502F (e.g., base module, clean water module). In some embodiments, the clean water is pumped via pump 510B from pump module 502F for usage (e.g., water consumption by users). Over time, the water treatment media (e.g., filtration media, strainers, zeolite media, carbon media, micron media, UF media, UV media, etc.) of one or more of the operation modules 502 decreases pressure of water flowing through the treatment media (e.g., responsive to becoming dirty, collecting particulates, collecting debris, etc.). Responsive to the water pressure in the modular support system 500 dropping, one or more backwash operations can be performed as displayed in FIGS. 5B-C.

Referring to FIG. 5B, responsive to sensor data indicating pressure has dropped below a threshold level, responsive to a schedule, responsive to user input, and/or the like a backwash operation is provided for one or more of the operation modules 502. The valves of one or more corresponding valve modules 504 are placed in a closed position. A backwash pump 510C in pump module 502F provides treated water (e.g., water that has gone through the other operation modules 502) from the pump module 502F through a backwash pipe 520B to nozzles in one or more water treatment modules 502. In some embodiments, a jet of water is directed to the lower layer and/or the upper level of water treatment media in the water treatment modules 502 to clean the water treatment media. The water level increases in the water treatment modules 502 responsive to the water being provided via the backwash pump 510C and backwash pipe 520B.

Referring to FIG. 5C, valves in the water treatment modules coupled to a disposal pipe 502C are opened and the water provided via the backwash pipe 520B and the particles (e.g., debris) from the operation modules 502 flow out of the water treatment modules 502 via the disposal pipe 502C to be disposed. One or more backwash operations can occur to decrease the loss in pressure caused by the used treatment media in the water treatment modules 502.

Each of the water treatment modules 502 has a spray head arrangement (e.g., one or more backwash spray devices) designed to clean debris off the surface of the media in the water treatment module 502. In some embodiments, the spray heads are customized to the type of media contained within the water treatment module 502. In some embodiments, the interior of the water treatment modules 502 is customized to foster spray patterns conducive to removal of debris (e.g., schmutzdecke disposed on the media and/or other surfaces in the water treatment module 502). For loose granular media, a wide dispersion nozzle may be used to spray clean water down onto the media and into the interior volume of the operation module 502 to agitate the surface schmutzdecke that develops on the surface of some types of filter media.

Through an arrangement of valves (e.g., valve modules 504), the interior volume of an operation module 502 is isolated during the backwash operation, the water level in the interior volume rises, and water is expelled through a drainage port below the level of the spray head into a disposable collection system. With the rising water, loose flotsam (e.g., debris) is carried in the water flow out of the operation module 502, leaving refreshed media behind. For operation modules 502 with membrane filters where a cake develops over the membrane, a high pressure spray head can be employed as a water jet to slice and break apart the cake sediment above the membrane. Through the same arrangement of valves used in granular media operation modules 502, the interior volume housing the membrane is isolated when this backwash operation occurs. The water level in the interior volume rises and water is expelled through a drainage port below the level of the spray head into a disposable collection system. With the rising water, loose flotsam is carried in the water flow out of the operation module 502, leaving a refreshed (e.g., clean) membrane behind.

The UF and UV combined operation module 502 also incorporates a high-pressure freshwater backwash system which reverses flow through each apparatus and then drains through the same ports of the operation module 502 to a collection point for disposal. In some embodiments, the UF/UV filtration module 502E has a double-sized height compared to other operation modules 502 to fit the UF and UV treatment media. In some embodiments, the operation module 502 (e.g., pump module 502F) that receives and stores the treated water has a larger interior volume than other operation modules 502.

Figure 6B:
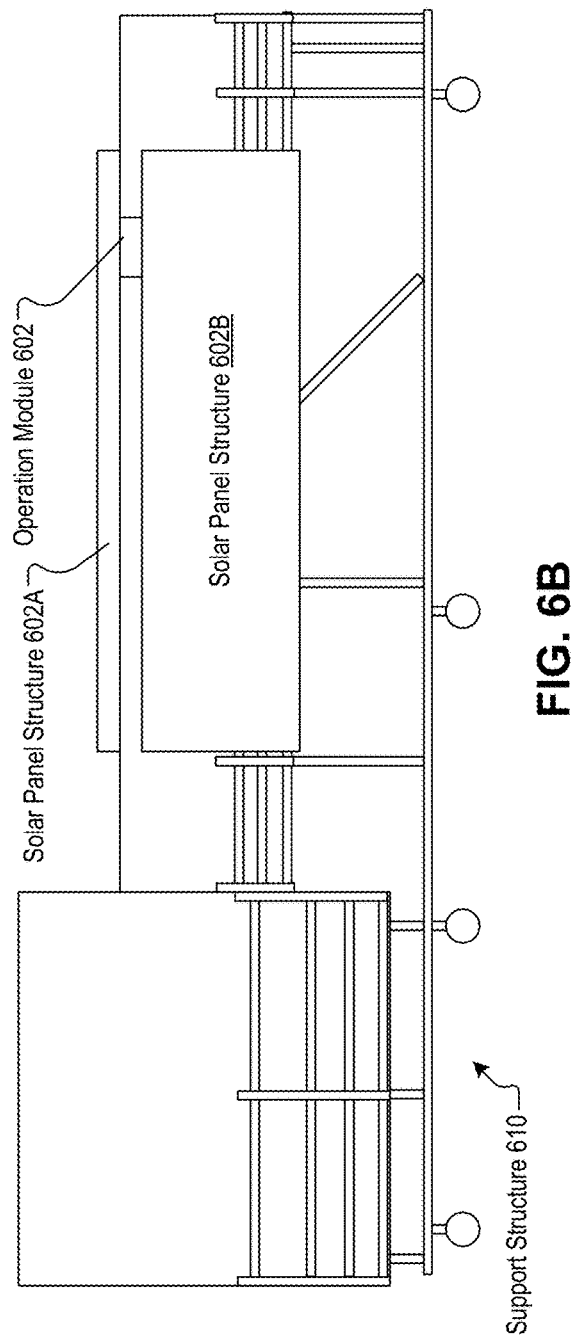

FIGS. 6A-B illustrate assembly of a modular support system 600 (e.g., modular support system 100 of FIGS. 1A-D), according to certain embodiments.

In some embodiments, a support structure 610 matches at least a portion of the outer surface of an assembled modular support system 600. In some examples, the modular support system 600 has a cylindrical base portion that has a greater diameter than the diameter a cylindrical upper portion and the support structure 610 matches a portion of those diameters (e.g., a bottom quarter to third of the outer surface of the modular support system 600).

Referring to FIG. 6A, assembly includes placing the central core 604 on the support structure 610 and adding other components around the central core 604 (e.g., operation module 602, interlock module cap structures, solar panel structures, etc.).

Referring to FIG. 6B, assembly continues until each of the components are added to the central core 604. In some embodiments, the support structure 610 can be moved laterally (e.g., via wheels) and can be used to place the modular support system 600 in an upright position (e.g., via an actuator).

In some embodiments, assembly of the modular support system 600 begins in a factory on the support structure 610, which may be a jig configured for rapid assembly, shipment, and deployment. Through a spit-type arrangement, the central core 604 of the modular support system 600 is mounted in the support structure 610 horizontally. Parts are affixed to the central core 604 and the entire assembly rotates allowing insertion of the interlocking modules and the operating modules 602.

In some embodiments, the support structure 610 is made of lightweight metal (e.g., aluminum) beams and tubing. The support structure 610 has mobility in the factory with wheels being affixed to the frame. The support structure 610 is equipped with various arms and supports to hold and retain components of the modular support system 600 during assembly, shipment, and deployment. The support structure 610 also has actuators that attach to the face of the modular support system 600 to lift the modular support system 600 out of the support structure 610 to erect the modular support system 600 on site. In some embodiments, the actuators of the support structure 610 are powered by the battery system of the modular support system 600.

In some embodiments, the modular support system 600 is configured to be deployed via an aircraft, parachute insertion, and helicopter. The modular support system 600 is designed to remain upright in all weather and climate conditions upon landing. The base of the unit is weighted with equipment and ballast. The base is also equipped with one or more soil spikes and anchors around the circumference and center of the base to facilitate secure installation in any environmental condition.

In some embodiments, an offshoot of the support structure 610 is an exoskeleton that is arranged around the body of the modular support system 600. The exoskeleton is made of fiber-reinforced polymer (FRP) and carbon fiber shapes that make the exoskeleton lightweight. The parachute and harness are attached to the exoskeleton which is attached to the modular support system 600.

The modular support system 600 is a modular and scalable structure built around the central core 604 and top and bottom capture plates (e.g., cap structures 107A-B of FIGS. 1B-D).

The central core 604 includes a pipe and around the pipe are placed independent modules (e.g., operation modules 102, interlock modules 103, etc.) in a radial pattern. The modules interlock with each other and are flush to the central core 604. In some embodiments, the modules are compressed against the central core 604 by external and internal locking mechanisms.

Modules stack on each other vertically and ports within the modules align with each other via to interconnect systems with the control module 108 (e.g., operating system), fluid flows, and power flows of the modular support system 600. Vertical and horizontal elements link forming an exo and internal skeleton providing rigidity and support throughout the modular support system 600.

The exoskeleton and central core attach to capture plates (e.g., cap structures 107 of FIGS. 1B-D) above and below the modules, locking the modules in place. The capture plates are used to mount additional equipment and lift points.

The modular support system 600 can be delivered fully assembled or in component form (e.g., separate interlock modules, operation modules, central core, etc.) to a deployment site.

Solar panel structures are mounted directly to the exoskeleton of the modular support system 600 through a pivot point and electro-hydraulically operated actuator. This provides maximum flexibility of placement for the panels and allows attaching multiple panels at different heights and locations around the circumference of the modular support system 600.

The modular support system 600 is configured to be transported fully assembled for ease of deployment. The modular support system 600 is designed with a cradle system (e.g., support structure 610) that attaches to the circumference of the modular support system 600 and fits within a container (e.g., within dimensions of a traditional 40 ft shipping container). In some embodiments, modules (e.g., interlock modules, operation modules, central core 604, etc.) are stacked and shipped separately. In some embodiments, modular support system 600 are transportable by truck using a combination of the cradle (e.g., support structure 610) and a rail system for deployment.

Figure 7A:
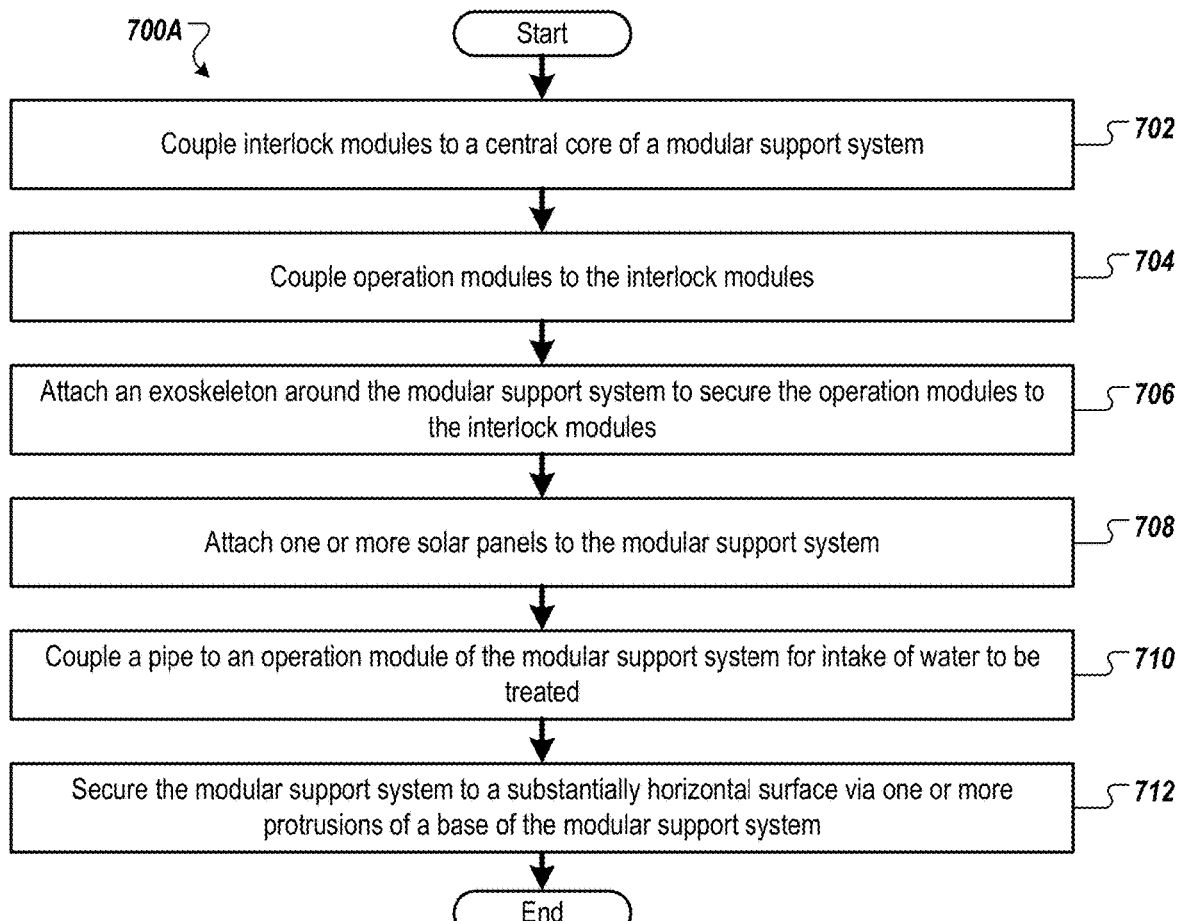
FIGS. 7A-B illustrate flow diagrams of methods associated with a modular support system, according to certain embodiments.
Figure 7B:
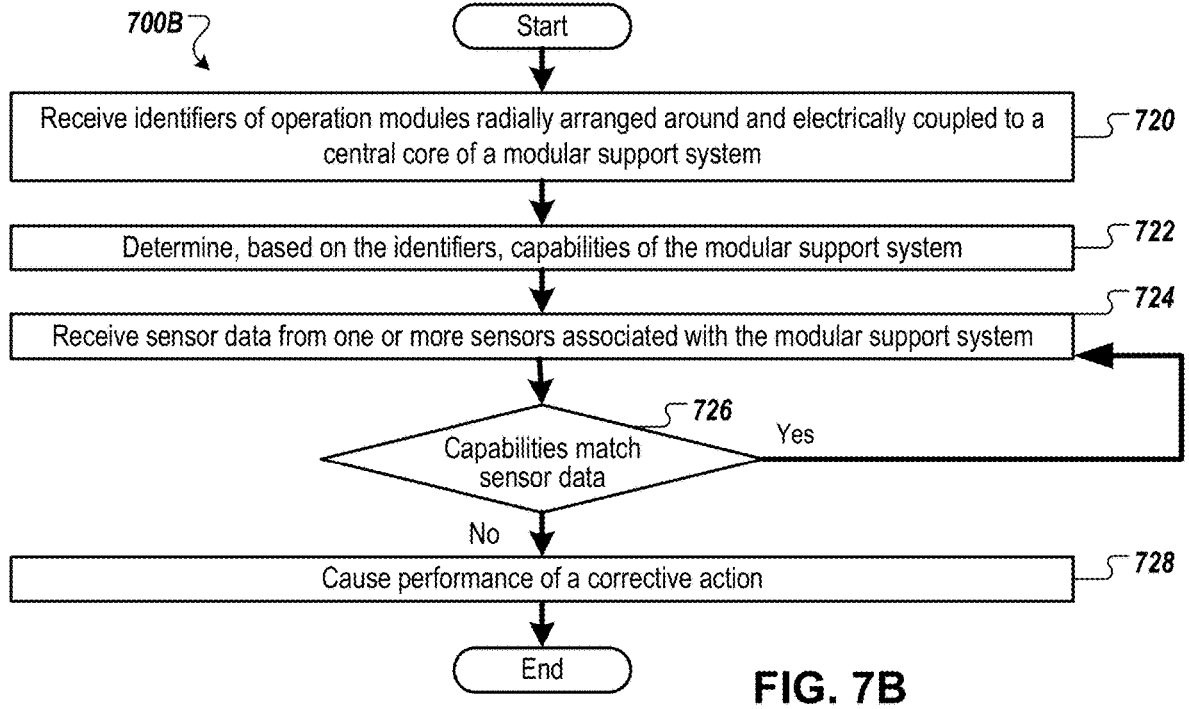

FIGS. 7A-B are flow diagrams of methods 700A-B associated with using a modular support system, according to certain embodiments. In some embodiments, one or both of methods 700A-B are performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, a non-transitory storage medium stores instructions that when executed by a processing device (e.g., of predictive system 130, of predictive server 132, of client device 136, assembly equipment, etc.), cause the processing device to perform one or more of methods 700A-B.

For simplicity of explanation, methods 700A-B are depicted and described as a series of operations. However, operations in accordance with this disclosure can occur in various orders and/or concurrently and with other operations not presented and described herein. Furthermore, in some embodiments, not all illustrated operations are performed to implement methods 700A-B in accordance with the disclosed subject matter. In addition, those skilled in the art will understand and appreciate that methods 700A-B could alternatively be represented as a series of interrelated states via a state diagram or events.

FIG. 7A is a flow diagram of a method 700A associated with assembly and installation of a modular support system (e.g., modular support system 100 of FIGS. 1A-D), according to certain embodiments. In some embodiments, one or more operations of method 700A are automated (e.g., assembly and/or installation equipment). In some embodiments, one or more operations of method 700A are performed manually.

Referring to FIG. 7A, in some embodiments, at block 702, interlock modules are coupled (e.g., radially coupled) to an outer surface of a central core of a modular support system. In some embodiments, each interlock module has a channel from an upper surface of the interlock module to a lower surface of the interlock module (e.g., through the center of the interlock module) that is sized to receive the central core. In some embodiments, the interlock modules are slid onto the central core while being supported on a support structure (e.g., support structure 610 of FIGS. 6A-B).

In some embodiments, the interlock modules couple to the central core so that the recesses (e.g., configured to receive operation modules) of the interlock modules are aligned. In some embodiments, the interlock modules couple to the central core so that channels from an upper surface to a lower surface of the interlock modules (e.g., for routing piping, conduits, electrical wiring, etc.) are aligned. In some embodiments, the interlock modules are aligned with the central core so that channels from an outer surface of the interlock module to the central channel (e.g., for receiving the central core) are aligned with openings in the central core (e.g., for receiving piping, conduits, wiring, etc. from the central core, for allowing airflow through the interlock module and then through the central core to remove heat, etc.).

In some embodiments, responsive to coupling the interlock modules to the central core (e.g., sliding interlock modules onto the central core), a first cap structure is positioned proximate (e.g., coupled to, attached to) a first distal end of the central core and a second cap structure is positioned proximate (e.g., coupled to, attached to) a second distal end of the central core. In some embodiments, the cap structures secure the interlock modules to the central core (e.g., prevent the interlock modules from sliding off of the central core).

In some embodiments, capabilities to be provided by the modular support system are determined based one or more of user input, type of water contamination, water quality, water usage, power usage, local communication infrastructure, and/or the like. Types and quantities of operation modules are selected based on the capabilities to be provided by the modular support system. The number of interlocking modules and the height of the central core are selected based on the types and quantities of operation modules. In some embodiments, openings (e.g., channels, recesses, holes) in the interlocking modules and central core are selected based on the types of operation modules. In some embodiments, components (e.g., intake pipe, backwash pipe, discharge pipe, wiring, wire gauge, conduits, etc.) routed through the central core are based on the number and types of operation modules. In some embodiments, the central core and interlock modules are the same for different types and numbers of operation modules.

At block 704, operation modules are radially coupled to the interlock modules (e.g., coupling each operation module to a corresponding interlock module to radially arrange the operation modules around the central core). The operation modules are slid into the recesses formed by the interlock modules. In some embodiments, features (e.g., recesses, slots) of the operation modules engage with features (e.g., protrusions) of the interlock modules. In some embodiments, the operation modules are installed in the modular support system while the modular support system is supported on a support structure (e.g., support structure 610 of FIGS. 6A-B).

In some embodiments, block 704 includes mechanically coupling a first sidewall of an operation module to a first recess sidewall of an interlock module, mechanically coupling a second sidewall of the operation module to a second recess sidewall of the interlock module, and electrically coupling one or more devices disposed in the operation module with the central core via an electrical interconnect (e.g., via a rear wall of the operation module).

At block 706, an exoskeleton is attached around the modular support system to secure the operation modules and interlock modules to the central core. In some embodiments, the exoskeleton is removably attached around the modular support system. In some embodiments, the exoskeleton is made of one or more of fabric, elastic, nylon, plastic, metal, FRP, carbon fiber, and/or the like. In some embodiments, the exoskeleton forms openings (e.g., the exoskeleton is a mesh, expanded wire mesh, nylon mesh, etc.) that allows air passage through and around one or more components of the modular support system. In some embodiments, the modular support system is configured to be lifted, erected, dropped, parachuted, etc. by securing the exoskeleton (e.g., exoskeleton is configured to lift the modular support structure responsive to the exoskeleton being lifted).

At block 708, one or more solar panel structures are attached to the modular support structure. In some embodiments, the one or more solar panel structures are attached to an operation module that forms a ring around the central core (e.g., the operation module forms a channel from an upper surface to a lower surface to receive the central core). In some embodiments, the operation module configured to attach to the solar panel structures is coupled to the central core at block 702 with the interlock modules. In some embodiments, the operation module configured to attach to the solar panel structures is located proximate the center of gravity of the modular support system.

At block 710, a pipe is coupled to an operation module (e.g., housing an intake pump) of the modular support system for intake of water to be treated.

At block 712, the modular support system is secured to a substantially horizontal surface (e.g., ground, soil, ice, cement, bottom of a body of water, etc.) via one or more protrusions of a base (e.g., cap structure) of the modular support system. In some embodiments, the modular support system is erected via the support structure (e.g., support structure 610 of FIGS. 6A-B). In some embodiments, a parachute and harness are coupled to the exoskeleton for aerial deployment of the modular support system.

FIG. 7B is a flow diagram of a method 700B associated with use of a modular support system (e.g., modular support system 100 of FIGS. 1A-D), according to certain embodiments. In some embodiments, one or more operations of method 700A are performed by predictive system 130, predictive server 132, client device, or control module 108 of FIG. 1A.

Referring to FIG. 7B, in some embodiments, at block 720 processing logic receives identifiers of operation modules radially arranged around and electrically coupled to a central core of a modular support system. In some embodiments, block 720 is responsive to coupling the operation modules to the modular support system (e.g., block 704 of FIG. 7A). In some embodiments, the operation modules include tags (e.g., RFID tags, NFC tags) and responsive to coupling each operation module to the modular support system, the processing logic (e.g., control component of the modular support system) receives the corresponding identifier. In some embodiments, each operation module includes an electrical interconnect (e.g., blade or protruding portion) that electrically couples with the central core responsive to coupling the operation modules with the interlock modules and the processing logic receives an identifier from an operation module via the electrical interconnect (e.g., and an electrical connection via the central core).

At block 722, processing logic determines, based on the identifiers, capabilities of the modular support system. In some embodiments, an identifier is associated with information associated with the operation module. The information includes one or more of type of operation module (e.g., water treatment, power generating, power storage, communication, control module, storage, dummy, etc.), type of device located in the operating module, capabilities of the device in the operating module, capabilities of the operation module, type of water treatment media, storage capacity of batteries, how much currently charged, pressure drop through water treatment media, contaminants the water treatment media can remove, flow rate of treated water, power generation rate, and/or the like.

At block 724, processing logic receives sensor data from one or more sensors associated with the modular support system (e.g., located in the operation modules). In some embodiments, the sensor data indicates a type of contaminant, a rate of water treatment or power generation, a rate of usage of water or power, quality of data received, temperature or pressure of pumps, and/or the like.

At block 726, processing logic determines whether the capabilities match the sensor data. Responsive to the capabilities matching the sensor data, flow returns to block 724 (e.g., to continue monitoring sensor data). Responsive to the capabilities not matching the sensor data, flow continues to block 728.

At block 728, processing logic causes performance of a corrective action based on the capabilities not matching the sensor data. In some embodiments, the performance of the corrective action includes providing an alert that a new operation module is to be installed. In some examples, the alert is a result of and/or is indicative of one or more of the current operation modules are not capable of treating a current contaminant in the water that was detected via the sensors, the current operation modules are not capable of meeting demand (e.g., treated water demand, power demand, communication demand), the modular support system includes an operation module in need of repair or replacement, and/or the like. In some embodiments, the performance of the corrective action includes providing an alert that an operation module is to be repaired. In some embodiments, the performance of the corrective action includes interrupting operation of one or more of the operation modules (e.g., stopping water treatment, stopping power generation, stopping sending communications, no longer powering one or more portions of the modular support system, etc.). In some embodiments, the performance of the corrective action includes switching operation to one or more different operation modules (e.g., using a different column of operation modules, using a combination of columns of operation modules, using multiple modular support systems to perform one or more operations, and/or the like). In some embodiments, the performance of the corrective action includes causing a backwash operation of water treatment media of an operation module.

In some embodiments, the performance of the corrective action includes generating a schedule for one or more operations (e.g., backwash operations, pumping operations, valve opening and closing, solar panel structure orientation, solar panel structure opening and closing, providing power to one or more components, collection and/or transmission of data, etc.).

In some embodiments, the corrective action of block 728 of FIG. 7B is determined by providing input of sensor data of block 724 of FIG. 7B to a trained machine learning model (e.g., see FIG. 1A and FIGS. 8-10C).

FIG. 8 illustrates data set generator 172 (e.g., data set generator 172 of FIG. 1) to create data sets for a machine learning model (e.g., model 190 of FIG. 1), according to certain embodiments. In some embodiments, data set generator 172 is part of server machine 170 of FIG. 1.

Figure 11:
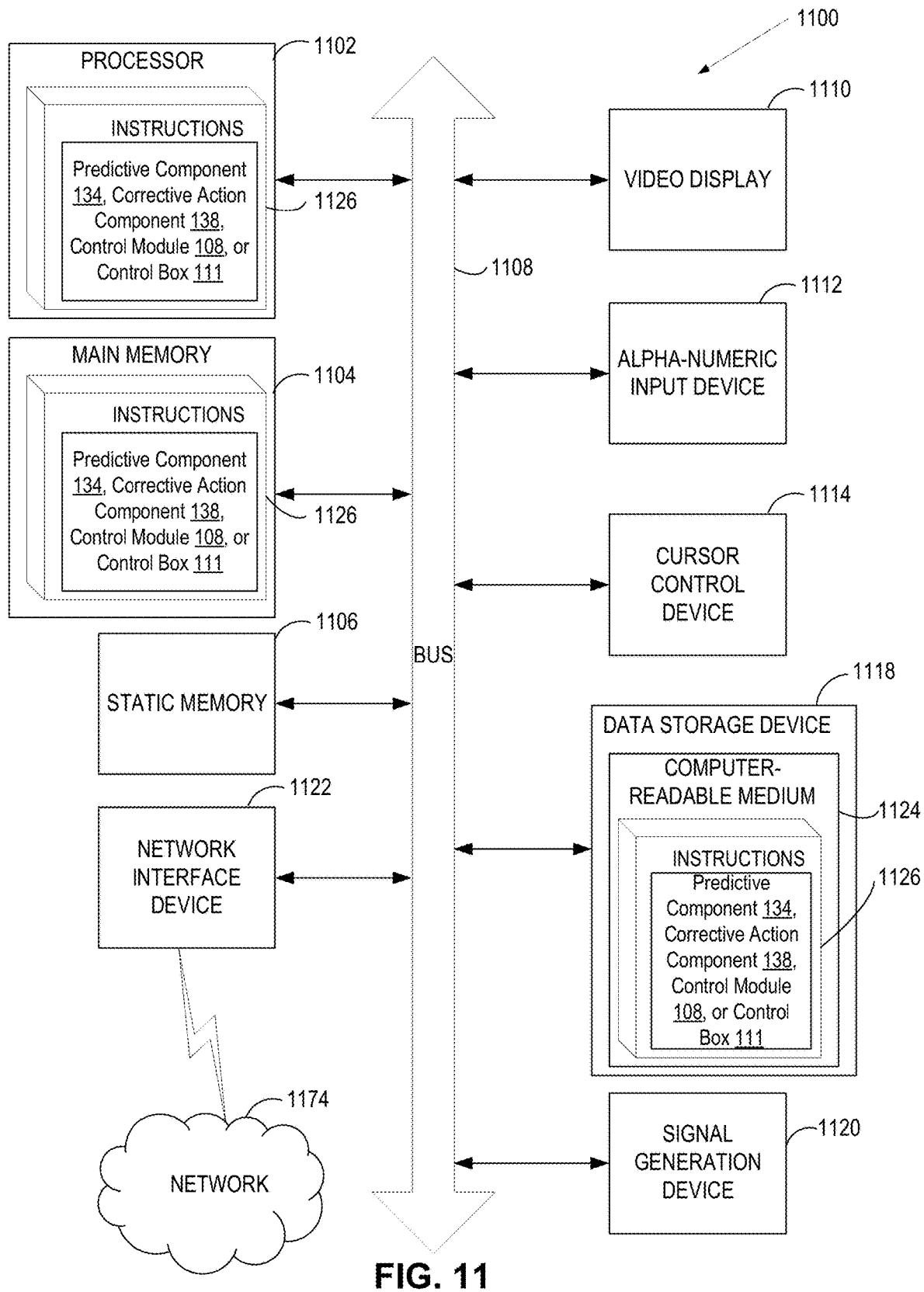
FIG. 11 is a block diagram illustrating a computer system, according to certain embodiments.

Data set generator 172 creates data sets for a machine learning model (e.g., model 190 of FIG. 1). Data set generator 172 creates data sets using historical sensor data 144 and historical performance data 154. System 1100 of FIG. 11 shows data set generator 172, data inputs 810, and target output 820.

In some embodiments, data set generator 172 generates a data set (e.g., training set, validating set, testing set) that includes one or more data inputs 810 (e.g., training input, validating input, testing input) and one or more target outputs 820 that correspond to the data inputs 810. The data set also includes mapping data that maps the data inputs 810 to the target outputs 820. Data inputs 810 are also referred to as "features," "attributes," or "information." In some embodiments, data set generator 172 provides the data set to the training engine 182, validating engine 184, or testing engine 186, where the data set is used to train, validate, or test the machine learning model 190. Some embodiments of generating a training set are further described with respect to FIG. 10A.

In some embodiments, data set generator 172 generates the data input 810 and target output 820. In some embodiments, data inputs 810 include one or more sets of historical sensor data 144. Each instance of historical sensor data 144 includes one or more of sensor data from one or more types of sensors, combination of sensor data from one or more types of sensors, patterns from sensor data from one or more types of sensors, etc.

In some embodiments, data set generator 172 generates a first data input corresponding to a first set of historical sensor data 144A to train, validate, or test a first machine learning model and the data set generator 172 generates a second data input corresponding to a second set of historical sensor data 144B to train, validate, or test a second machine learning model.

In some embodiments, the data set generator 172 discretizes (e.g., segments) one or more of the data input 810 or the target output 820 (e.g., to use in classification algorithms for regression problems). Discretization (e.g., segmentation via a sliding window) of the data input 810 or target output 820 transforms continuous values of variables into discrete values. In some embodiments, the discrete values for the data input 810 indicate discrete historical sensor data 144 to obtain a target output 820 (e.g., discrete performance data 154).

Data inputs 810 and target outputs 820 to train, validate, or test a machine learning model include information for a particular location (e.g., region, city, body of water, etc.). In some examples, historical sensor data 144 and historical performance data 154 are for the same location and/or modular support system.

In some embodiments, the information used to train the machine learning model is from specific types and/or groups of components (e.g., operation modules) of modular support systems having specific characteristics (e.g., same or similar columns of operation modules) and allow the trained machine learning model to determine outcomes for same or similar types and/or groups of components having same or similar specific characteristics based on current sensor data 146.

In some embodiments, subsequent to generating a data set and training, validating, or testing a machine learning model 190 using the data set, the machine learning model 190 is further trained, validated, or tested (e.g., current performance data 156 of FIG. 1) or adjusted (e.g., adjusting weights associated with input data of the machine learning model 190, such as connection weights in a neural network).

Figure 9:
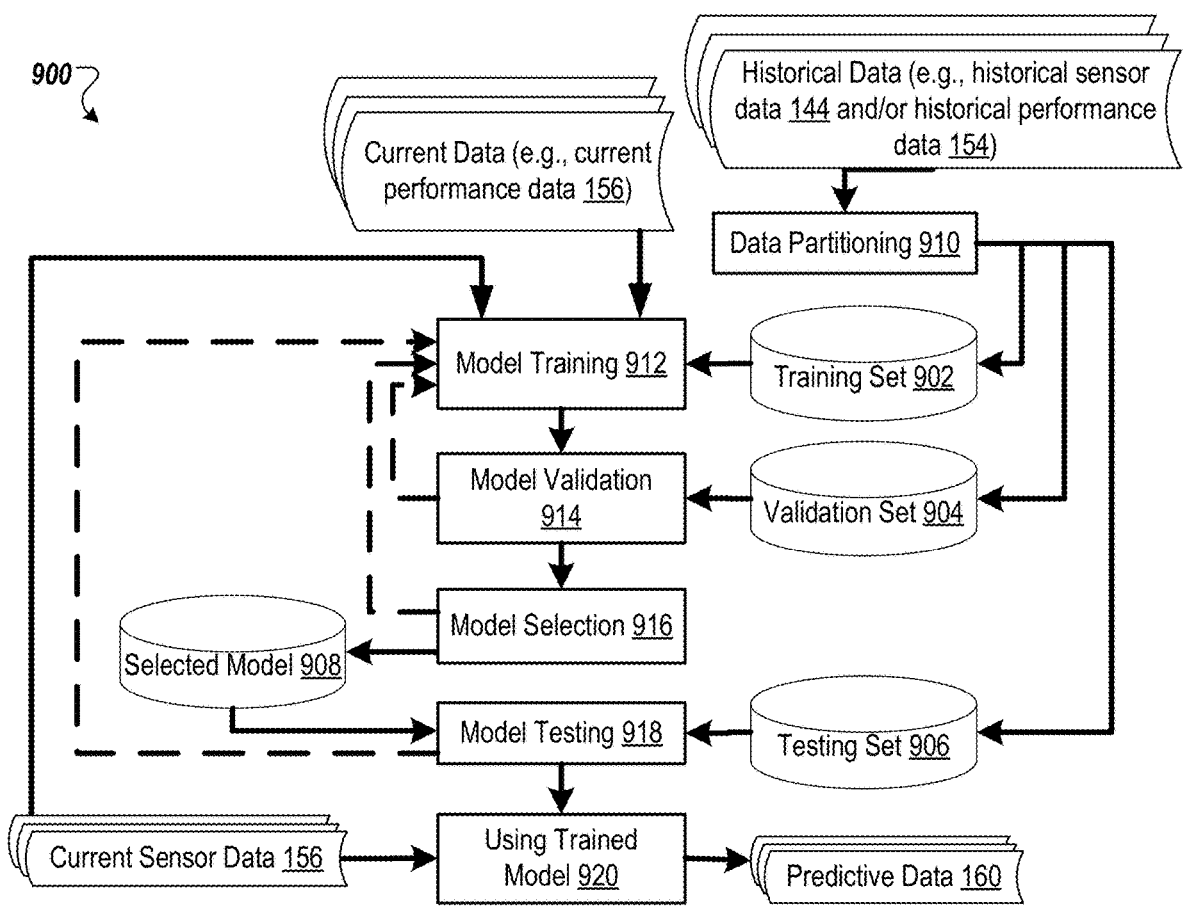
FIG. 9 is a block diagram illustrating determining predictive data for a modular support system, according to certain embodiments.

FIG. 9 is a block diagram illustrating a system 900 (e.g., predictive system 110 of FIG. 1) for generating predictive data 160, according to certain embodiments. The system 900 is used to determine predictive data 160 (e.g., via model 190 of FIG. 1) to cause a corrective action associated with a modular support system (e.g., modular support system 100 of FIGS. 1A-D).

At block 910, the system 900 performs data partitioning (e.g., via data set generator 172 of server machine 170 of FIG. 1) of the historical data (e.g., historical sensor data 144 and historical performance data 154 of FIG. 1) to generate the training set 902, validation set 904, and testing set 906. In some examples, the training set is 60% of the historical data, the validation set is 20% of the historical data, and the testing set is 20% of the historical data. The system 900 generates a plurality of sets of features for each of the training set, the validation set, and the testing set. In some examples, if the historical data includes features derived from sensor data from 20 sensors (e.g., sensors 106 of FIG. 1) and 100 iterations (e.g., iterations associated with treating water, generating electricity, and/or communications that each correspond to the sensor data from the 20 sensors), a first set of features is sensors 1-10, a second set of features is sensors 11-20, the training set is iterations 1-60, the validation set is iterations 61-80, and the testing set is iterations 81-100. In this example, the first set of features of the training set would be sensor data from sensors 1-10 for iterations 1-60.

At block 912, the system 900 performs model training (e.g., via training engine 182 of FIG. 1) using the training set 902. In some embodiments, the system 900 trains multiple models using multiple sets of features of the training set 902 (e.g., a first set of features of the training set 902, a second set of features of the training set 902, etc.). For example, system 900 trains a machine learning model to generate a first trained machine learning model using the first set of features in the training set (e.g., sensor data from sensors 1-10 for iterations 1-60) and to generate a second trained machine learning model using the second set of features in the training set (e.g., sensor data from sensors 11-20 for iterations 1-60). In some embodiments, the first trained machine learning model and the second trained machine learning model are combined to generate a third trained machine learning model (e.g., which is a better predictor than the first or the second trained machine learning model on its own in some embodiments). In some embodiments, sets of features used in comparing models overlap (e.g., first set of features being sensor data from sensors 1-15 and second set of features being sensors 5-20). In some embodiments, hundreds of models are generated including models with various permutations of features and combinations of models.

At block 914, the system 900 performs model validation (e.g., via validation engine 184 of FIG. 1) using the validation set 904. The system 900 validates each of the trained models using a corresponding set of features of the validation set 904. For example, system 900 validates the first trained machine learning model using the first set of features in the validation set (e.g., sensor data from sensors 1-10 for iterations 61-80) and the second trained machine learning model using the second set of features in the validation set (e.g., sensor data from sensors 11-20 for iterations 61-80). In some embodiments, the system 900 validates hundreds of models (e.g., models with various permutations of features, combinations of models, etc.) generated at block 912. At block 914, the system 900 determines an accuracy of each of the one or more trained models (e.g., via model validation) and determines whether one or more of the trained models has an accuracy that meets a threshold accuracy. Responsive to determining that none of the trained models has an accuracy that meets a threshold accuracy, flow returns to block 912 where the system 900 performs model training using different sets of features of the training set. Responsive to determining that one or more of the trained models has an accuracy that meets a threshold accuracy, flow continues to block 916. The system 900 discards the trained machine learning models that have an accuracy that is below the threshold accuracy (e.g., based on the validation set).

At block 916, the system 900 performs model selection (e.g., via selection engine 185 of FIG. 1) to determine which of the one or more trained models that meet the threshold accuracy has the highest accuracy (e.g., the selected model 908, based on the validating of block 914). Responsive to determining that two or more of the trained models that meet the threshold accuracy have the same accuracy, flow returns to block 912 where the system 900 performs model training using further refined training sets corresponding to further refined sets of features for determining a trained model that has the highest accuracy.

At block 918, the system 900 performs model testing (e.g., via testing engine 186 of FIG. 1) using the testing set 906 to test the selected model 908. The system 900 tests, using the first set of features in the testing set (e.g., sensor data from sensors 1-10 for iterations 81-100), the first trained machine learning model to determine the first trained machine learning model meets a threshold accuracy (e.g., based on the first set of features of the testing set 906). Responsive to accuracy of the selected model 908 not meeting the threshold accuracy (e.g., the selected model 908 is overly fit to the training set 902 and/or validation set 904 and is not applicable to other data sets such as the testing set 906), flow continues to block 912 where the system 900 performs model training (e.g., retraining) using different training sets corresponding to different sets of features (e.g., sensor data from different sensors). Responsive to determining that the selected model 908 has an accuracy that meets a threshold accuracy based on the testing set 906, flow continues to block 920. In at least block 912, the model learns patterns in the historical data to make predictions and in block 918, the system 900 applies the model on the remaining data (e.g., testing set 906) to test the predictions.

At block 920, system 900 uses the trained model (e.g., selected model 908) to receive current sensor data 146 and determines (e.g., extracts), from the output of the trained model, predictive data 160 to perform corrective actions associated with the modular support system 100. In some embodiments, the current sensor data 146 corresponds to the same types of features in the historical sensor data 144. In some embodiments, the current sensor data 146 corresponds to a same type of features as a subset of the types of features in historical sensor data that are used to train the selected model 908.

In some embodiments, current data is received. In some embodiments, current data includes current performance data 156. The model 908 is re-trained based on the current data. In some embodiments, a new model is trained based on the current data and the current sensor data 146.

In some embodiments, one or more of the operations 910-920 occur in various orders and/or with other operations not presented and described herein. In some embodiments, one or more of operations 910-920 are not be performed. For example, in some embodiments, one or more of data partitioning of block 910, model validation of block 914, model selection of block 916, and/or model testing of block 918 are not performed.

Figure 10A:
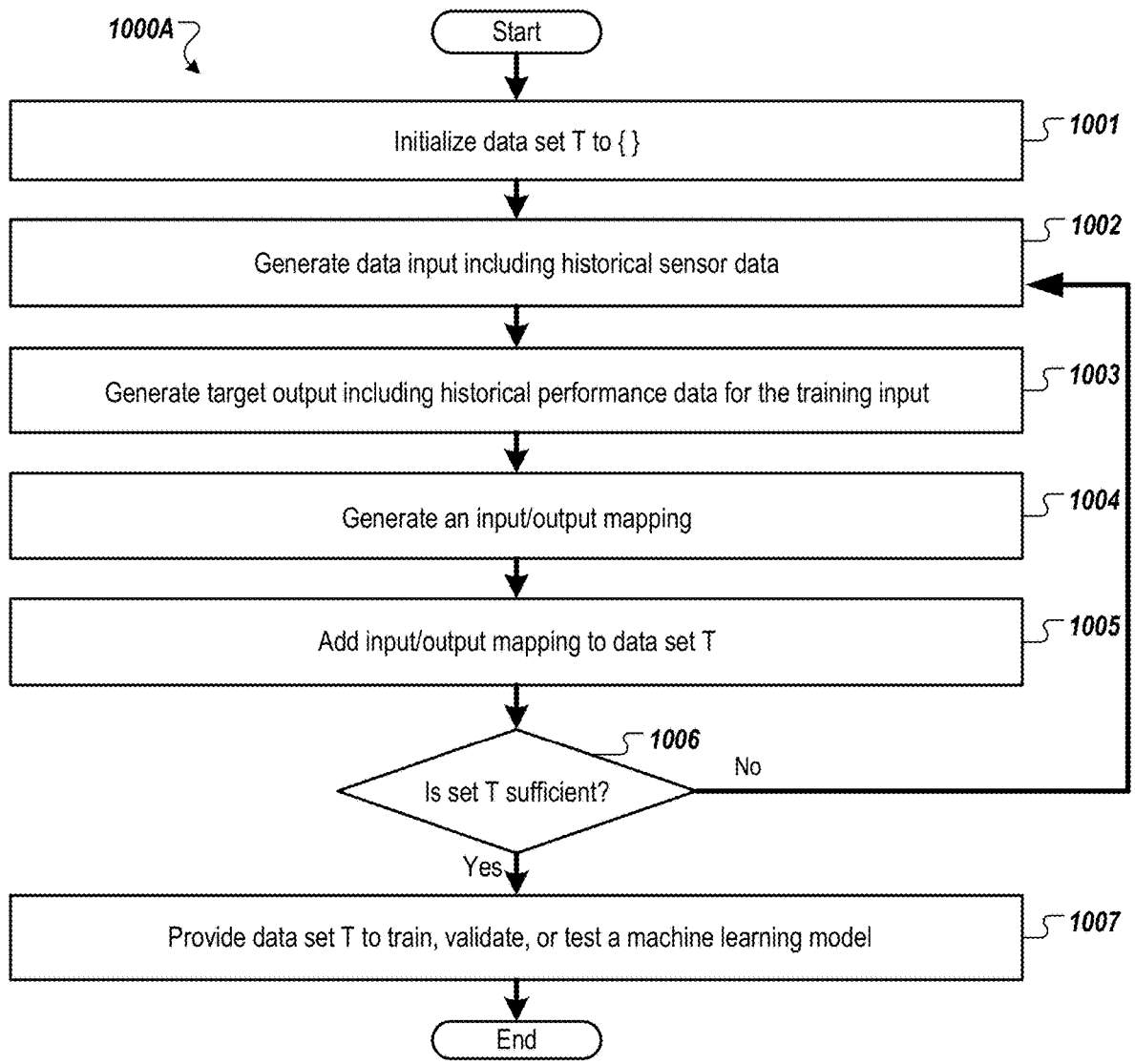
FIGS. 10A-C illustrate flow diagrams of methods associated with a modular support system, according to certain embodiments.
Figure 10B:
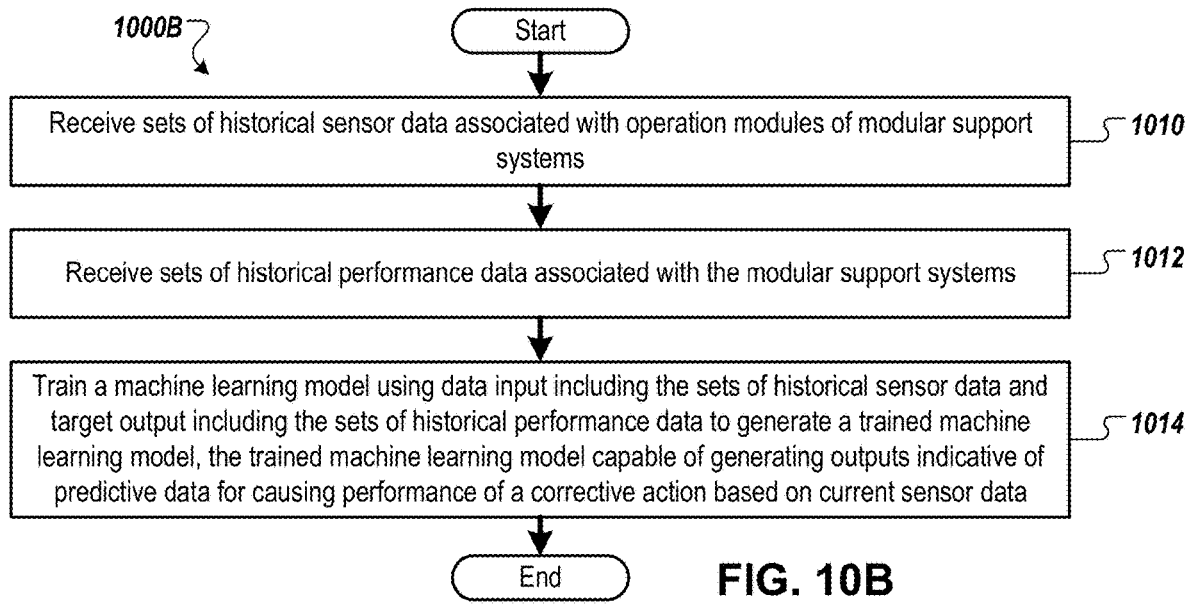
Figure 10C:
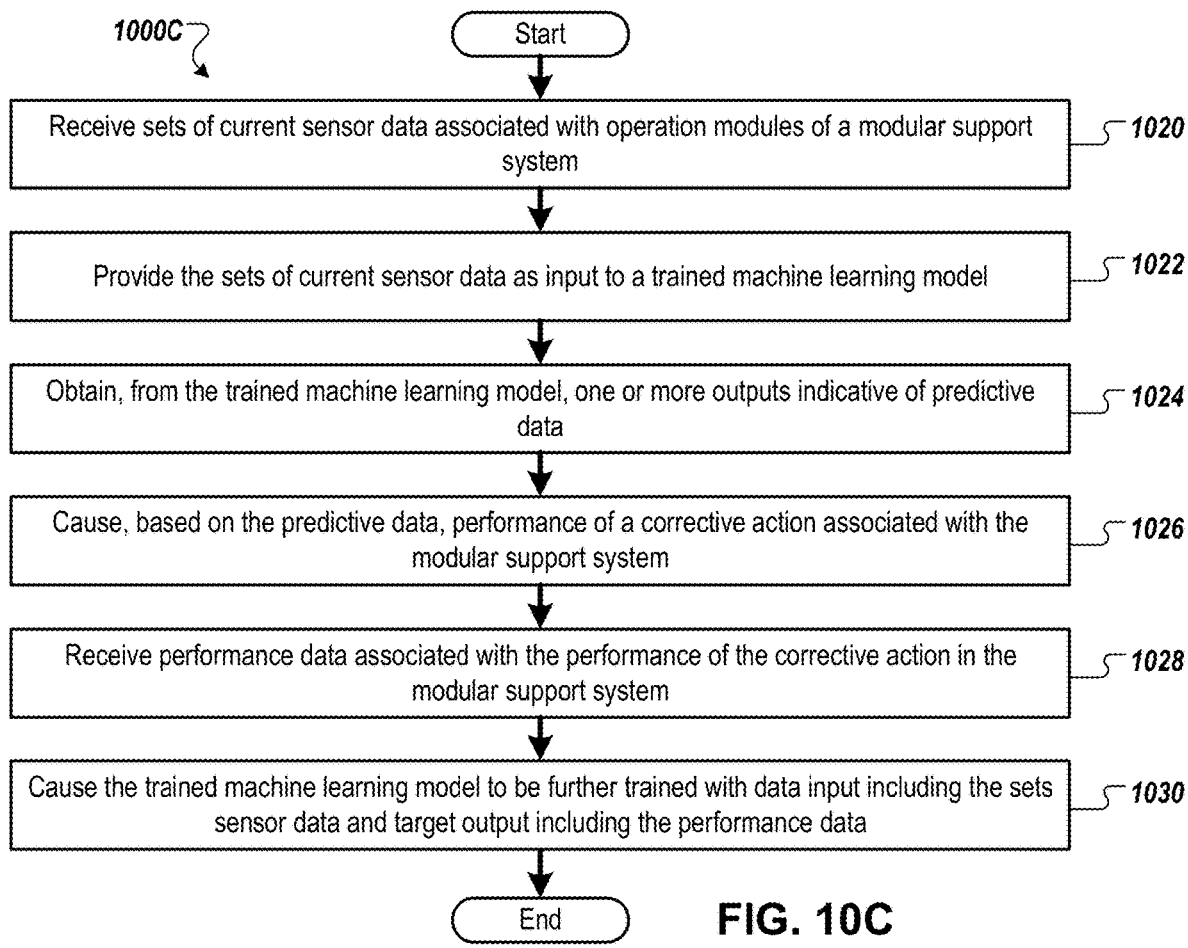

FIGS. 10A-C are flow diagrams of methods 1000A-C associated with generating predictive data to cause a corrective action associated with a modular support system, according to certain embodiments. In some embodiments, methods 1000A-C are performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiment, methods 1000A-C are performed, at least in part, by predictive system 110. In some embodiments, method 1000A is performed, at least in part, by predictive system 110 (e.g., server machine 170 and data set generator 172 of FIG. 1A, data set generator 172 of FIG. 8). In some embodiments, predictive system 110 uses method 1000A to generate a data set to at least one of train, validate, or test a machine learning model. In some embodiments, method 1000B is performed by server machine 180 (e.g., training engine 182, etc.). In some embodiments, method 1000C is performed by predictive server 112 (e.g., predictive component 114). In some embodiments, a non-transitory storage medium stores instructions that when executed by a processing device (e.g., of predictive system 110, of server machine 180, of predictive server 112, control module 108, etc.), cause the processing device to perform one or more of methods 1000A-C. In some embodiments, any of the methods described herein are performed by a server, by a client device, and/or a control module 108 of a modular support system 100.

For simplicity of explanation, methods 1000A-C are depicted and described as a series of operations. However, operations in accordance with this disclosure can occur in various orders and/or concurrently and with other operations not presented and described herein. Furthermore, in some embodiments, not all illustrated operations are performed to implement methods 1000A-C in accordance with the disclosed subject matter. In addition, those skilled in the art will understand and appreciate that methods 1000A-C could alternatively be represented as a series of interrelated states via a state diagram or events.

FIG. 10A is a flow diagram of a method 1000A for generating a data set for a machine learning model for generating predictive data (e.g., predictive data 160 of FIG. 1), according to certain embodiments.

Referring to FIG. 10A, in some embodiments, at block 1001 the processing logic implementing method 1000A initializes a training set T to an empty set.

At block 1002, processing logic generates first data input (e.g., first training input, first validating input, first testing input, etc.) that includes sensor data (e.g., historical sensor data 144 of FIGS. 1, 8, and/or 9). In some embodiments, the first data input includes a first set of features for types of sensor data and a second data input includes a second set of features for types of sensor data (e.g., as described with respect to FIG. 8). In some embodiments, the historical sensor data includes flow rates, power generation rates, pressure, temperature, water usage, power usage, communication rate, and/or the like.

At block 1003, processing logic generates a first target output for one or more of the data inputs (e.g., first data input). In some embodiments, the first target output is historical performance data (e.g., historical performance data 154 of FIGS. 1, 8, and/or 9). In some embodiments, the historical performance data includes flow rates, power generation rates, communication rates, and/or the like. In some embodiments, the historical performance data is associated with performance of a corrective action (e.g., backwash operation, schedule of maintenance, etc.).

At block 1004, processing logic optionally generates mapping data that is indicative of an input/output mapping. The input/output mapping (or mapping data) refers to the data input (e.g., one or more of the data inputs described herein), the target output for the data input (e.g., where the target output identifies historical performance data 154), and an association between the data input(s) and the target output.

At block 1005, processing logic adds the mapping data generated at block 1004 to data set T.

At block 1006, processing logic branches based on whether data set T is sufficient for at least one of training, validating, and/or testing machine learning model 190. If so, execution proceeds to block 1007, otherwise, execution continues back at block 1002. It should be noted that in some embodiments, the sufficiency of data set T is determined based simply on the number of input/output mappings in the data set, while in some other implementations, the sufficiency of data set T is determined based on one or more other criteria (e.g., a measure of diversity of the data examples, accuracy, etc.) in addition to, or instead of, the number of input/output mappings.

At block 1007, processing logic provides data set T (e.g., to server machine 180) to train, validate, and/or test machine learning model 190. In some embodiments, data set T is a training set and is provided to training engine 182 of server machine 180 to perform the training. In some embodiments, data set T is a validation set and is provided to validation engine 184 of server machine 180 to perform the validating. In some embodiments, data set T is a testing set and is provided to testing engine 186 of server machine 180 to perform the testing. In the case of a neural network, for example, input values of a given input/output mapping (e.g., numerical values associated with data inputs 810) are input to the neural network, and output values (e.g., numerical values associated with target outputs 820) of the input/output mapping are stored in the output nodes of the neural network. The connection weights in the neural network are then adjusted in accordance with a learning algorithm (e.g., back propagation, etc.), and the procedure is repeated for the other input/output mappings in data set T. After block 1007, machine learning model (e.g., machine learning model 190) can be at least one of trained using training engine 182 of server machine 180, validated using validating engine 184 of server machine 180, or tested using testing engine 186 of server machine 180. The trained machine learning model is implemented by predictive component 114 (of predictive server 112) to generate predictive data 160 for performing corrective action associated with a modular support system 100.

FIG. 10B is a method for training a machine learning model (e.g., model 190 of FIG. 1) for determining predictive data (e.g., predictive data 160 of FIG. 1) to perform a corrective action.

Referring to FIG. 10B, at block 1010 of method 1000B, the processing logic receives sets of historical sensor data (e.g., historical sensor data 144 of FIG. 1A) associated with one or more operation modules of one or more modular support systems. In some embodiments, the sensor data is collected over time from sensors of different modular support systems (e.g., sensors associated with different operation modules of the different modular support systems).

At block 1012, the processing logic receives sets of historical performance data (e.g., historical performance data 154 of FIG. 1A) associated with the one or more modular support systems. Each of the sets of the historical performance data corresponds to a respective set of historical sensor data of the sets of historical sensor data. In some embodiments, the historical performance data includes resulting sensor data after performing a corrective action. In some embodiments, the historical performance data includes pressure data, water treatment rates, water levels, whether water treatment rate meets the water usage rate, power used, and/or the like responsive to a corrective action associated with water treatment (e.g., a backwash operation, replacement or repair of a water treatment operation module, a pumping and valving schedule, and/or the like). In some embodiments, the historical performance data includes power storage levels, power generation rates, whether the power generation meets the power usage rate, and/or the like responsive to a corrective action associated with power generation (e.g., replacement or repair of a power generation or storage operation module, adding one or more batteries, cleaning the solar panels, updating schedule of orientation of the solar panel structures, updating schedule of opening and closing solar panel structures, and/or the like. In some embodiments, the historical performance data includes communication rates, communication bandwidth provided, whether communication bandwidth meet communication demand, communication quality, power used, and/or the like responsive to a corrective action associated with communication (e.g., replacement or repair of a communication operation module, adding one or more communication devices, maintenance of a communication device, etc.).

In some embodiments, the historical performance data includes information associated with the corrective action performed, such as iterations of backwash operations, schedule of backwash operations, schedule of orientation of solar panel structures, schedule of opening and closing solar panel structures, details about a new operation module, and/or the like.

At block 1014, the processing logic trains a machine learning model using data input including the sets of historical sensor data and target output including the historical performance data to generate a trained machine learning model. The trained machine learning model is capable of generating outputs indicative of predictive data (e.g., predictive data 160) to cause performance of one or more corrective actions (e.g., based on current sensor data) associated with one or more operating modules of a modular support system.

FIG. 10C is a method 1000C for using a trained machine learning model (e.g., model 190 of FIG. 1) for determining predictive data to cause performance of a corrective action.

Referring to FIG. 10C, at block 1020 of method 1000C, the processing logic receives sets of sensor data (e.g., current sensor data 146 of FIG. 1A) associated with one or more operation modules of the modular support system. In some embodiments, the sensor data is associated with one or more of water treatment operations, power generation and storage operations, and/or communication operations.

At block 1022, the processing logic provides the sets of sensor data as input to a trained machine learning model (e.g., the trained machine learning model of block 1014 of FIG. 10B).

At block 1024, the processing logic obtains, from the trained machine learning model, one or more outputs indicative of predictive data. In some embodiments, the predictive data is associated with predicted performance data resulting from performance of one or more corrective actions, lack of performance of a corrective action, a schedule of performing corrective actions, type of corrective actions (e.g., iterations of backwash operations, etc.), and/or the like.

At block 1026, the processing logic causes, based on the one or more outputs (e.g., predictive data), performance of a corrective action associated with the modular support system.

In some embodiments, the corrective action corresponds to operations (e.g., iterations of backwash operation), a replacement (e.g., a new operation module that the output of the trained machine learning model indicates would treat a contaminant in the water), a repair, an update to a schedule (e.g., update schedule of backwash operations, update schedule of solar panel structure orientations, etc.), and/or the like.

In some embodiments, processing logic determines a priority of resources (e.g., default priority, priority determined via machine learning, priority received via user input). The priority of resources can include a priority of one or more of meeting water demand (e.g., increasing backwash operations, replacing water treatment operation modules, minimizing power available for users, etc.), meeting power demand (e.g., minimizing water treatment operations, minimizing backwash operations, minimizing communication operations, a minimum power backup storage, etc.), and/or meeting communication demand (e.g., minimizing water treatment operations, minimizing backwash operations, minimizing power available for users, etc.). The priority of resources can include minimizing maintenance (e.g., switching to a new column of operation modules instead of performing maintenance on a column of operation modules, having slow water treatment rate or power generation rate instead of performing maintenance, etc.). The priority of resources can include minimizing cost (e.g., replacement or maintenance costs, power used from the grid, etc.) or maximizing output (e.g., of treated water, generated power, or communication bandwidth).

In some embodiments, the processing logic selects a corrective action based on the priority of resources and a predicted performance data. In some examples, the processing logic determines to perform a backwash operation (e.g., specific number of iterations of backwash operations of water treatment media in a specific operation module) responsive to a priority of meeting water demand and the predicted water treatment rate (e.g., at predicted low pressure of water that is treated by water treatment media in need of a backwash operation) without forming a backwash operation not meeting predicted water demand.

At block 1028, processing logic receives performance data (e.g., current performance data 156 of FIG. 1A) associated with the modular support system (e.g., associated with the sets of sensor data from block 1020). In some embodiments, the performance data is associated with operation of the modular support system after the performance of the corrective action (e.g., pressure data after performing a backwash operation). In some embodiments, the performance data received is different from the predicted data and in some embodiments, the performance data is substantially similar to the predicted data.

At block 1030, processing logic causes the trained machine learning model to be further trained (e.g., retrained) with data input including the sets of sensor data (e.g., from block 1020) and target output including the performance data (e.g., from block 1028).

In some embodiments, blocks 1020-1024 are repeated until the one or more outputs (e.g., predictive data) indicates that no further corrective actions are to be performed (e.g., predictive data indicates predictive performance data meeting water treatment, power, and/or communication demand without performing a corrective action).

FIG. 11 is a block diagram illustrating a computer system 1100, according to certain embodiments. In some embodiments, the computer system 1100 is one or more of client device 120, predictive system 110, server machine 170, server machine 180, predictive server 112, control module 108, or control box 111.

In some embodiments, computer system 1100 is connected (e.g., via a network, such as a Local Area Network (LAN), an intranet, an extranet, or the Internet) to other computer systems. In some embodiments, computer system 1100 operates in the capacity of a server or a client computer in a client-server environment, or as a peer computer in a peer-to-peer or distributed network environment. In some embodiments, computer system 1100 is provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein (e.g., one or more of methods 700A-B of FIGS. 7A-B, methods 1000A-C of FIGS. 10A-C, etc.).

In a further aspect, the computer system 1100 includes a processing device 1102, a volatile memory 1104 (e.g., Random Access Memory (RAM)), a non-volatile memory 1106 (e.g., Read-Only Memory (ROM) or Electrically-Erasable Programmable ROM (EEPROM)), and a data storage device 1116, which communicate with each other via a bus 1108.

In some embodiments, processing device 1102 is provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

In some embodiments, computer system 1100 further includes a network interface device 1122 (e.g., coupled to network 1174). In some embodiments, computer system 1100 also includes a video display unit 1110 (e.g., an LCD), an alphanumeric input device 1112 (e.g., a keyboard), a cursor control device 1114 (e.g., a mouse), and a signal generation device 1120.

In some implementations, data storage device 1116 includes a non-transitory computer-readable storage medium 1124 on which store instructions 1126 encoding any one or more of the methods or functions described herein, including instructions encoding components of FIG. 1A (e.g., corrective action component 138, predictive component 134, etc.) and for implementing methods described herein.

In some embodiments, instructions 1126 also reside, completely or partially, within volatile memory 1104 and/or within processing device 1102 during execution thereof by computer system 1100, hence, in some embodiments, volatile memory 1104 and processing device 1102 also constitute machine-readable storage media.

While computer-readable storage medium 1124 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In some embodiments, the methods, components, and features described herein are implemented by discrete hardware components or are integrated in the functionality of other hardware components such as ASICS, FPGAs, DSPs or similar devices. In some embodiments, the methods, components, and features are implemented by firmware modules or functional circuitry within hardware devices. In some embodiments, the methods, components, and features are implemented in any combination of hardware devices and computer program components, or in computer programs.

Unless specifically stated otherwise, terms such as "coupling," "securing," "attaching," "receiving," "determining," "causing," "providing," "interrupting," "switching," "training," "obtaining," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. In some embodiments, the terms "first," "second," "third," "fourth," etc. as used herein are meant as labels to distinguish among different elements and do not have an ordinal meaning according to their numerical designation.

Examples described herein also relate to an apparatus for performing the methods described herein. In some embodiments, this apparatus is specially constructed for performing the methods described herein, or includes a general purpose computer system selectively programmed by a computer program stored in the computer system. Such a computer program is stored in a computer-readable tangible storage medium.

Some of the methods and illustrative examples described herein are not inherently related to any particular computer or other apparatus. In some embodiments, various general purpose systems are used in accordance with the teachings described herein. In some embodiments, a more specialized apparatus is constructed to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

The terms "over," "under," "between," "disposed on," and "on" as used herein refer to a relative position of one material layer or component with respect to other layers or components. For example, one layer disposed on, over, or under another layer may be directly in contact with the other layer or may have one or more intervening layers. Moreover, one layer disposed between two layers may be directly in contact with the two layers or may have one or more intervening layers. Similarly, unless explicitly stated otherwise, one feature disposed between two features may be in direct contact with the adjacent features or may have one or more intervening layers.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

Reference throughout this specification to "one embodiment," "an embodiment," or "some embodiments" means that a particular feature, structure, or characteristic described in connection with the embodiment is included in at least one embodiment. Thus, the appearances of the phrase "in one embodiment," "in an embodiment," or "in some embodiments" in various places throughout this specification are not necessarily all referring to the same embodiment. In addition, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Also, the terms "first," "second," "third," "fourth," etc. as used herein are meant as labels to distinguish among different elements and can not necessarily have an ordinal meaning according to their numerical designation. When the term "about," "substantially," or "approximately" is used herein, this is intended to mean that the nominal value presented is precise within ±10%.

Although the operations of the methods herein are shown and described in a particular order, the order of operations of each method may be altered so that certain operations may be performed in an inverse order so that certain operations may be performed, at least in part, concurrently with other operations. In another embodiment, instructions or sub-operations of distinct operations may be in an intermittent and/or alternating manner.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A modular support system comprising:
   a central core; and
   a plurality of operation modules arranged radially around the central core, the plurality of operation modules comprising a first operation module that comprises:
   an enclosure structure forming a first interior volume, wherein the enclosure structure has a rear wall;
   a device disposed in the first interior volume, wherein the device is associated with one or more of water treatment, power generation, or communication; and
   a first electrical interconnect configured to electrically couple the device to the central core through the rear wall.

2. The modular support system of claim 1 further comprising:

a plurality of interlock modules coupled to the central core, wherein the central core is inserted through a corresponding central channel of each of the plurality of interlock modules, the plurality of interlock modules comprising a first interlock module forming a recess to receive the first operation module, the first interlock module comprising:
a first recess sidewall comprising a first feature configured to couple with a second feature of a first sidewall of the first operation module; and
a second recess sidewall comprising a third feature configured to couple with a fourth feature of a second sidewall of the first operation module.

3. The modular support system of claim 2, wherein:
the first interlock module further comprises an outer lateral surface and an inner lateral surface opposite the outer lateral surface;
the first interlock module forms a substantially horizontal channel from the outer lateral surface to the inner lateral surface;
the inner lateral surface is disposed proximate the central core; and
the substantially horizontal channel is configured to align with a hole formed in the central core to channel air through the substantially horizontal channel and the central core.

4. The modular support system of claim 3 further comprising a wind turbine blade device disposed in the substantially horizontal channel and configured to rotate to generate power and to remove heat from the modular support system.

5. The modular support system of claim 1, wherein:
a first set of stacked operation modules comprises the first operation module disposed on a second operation module;
the first set of stacked operation modules has a first height;
a third operation module has the first height; and
the first operation module is interchangeable with the first set of stacked operation modules.

6. The modular support system of claim 2, wherein the first interlock module forms an inner volume to store one or more components.

7. The modular support system of claim 1, wherein the central core is a vertical cylindrical tower structure that forms a partially enclosed volume.

8. An operation module comprising:
an enclosure structure forming an interior volume, the enclosure structure comprising:
an upper wall forming a first substantially vertical channel;
a lower wall forming a second substantially vertical channel, wherein the first substantially vertical channel and the second substantially vertical channel are configured to align with a plurality of substantially vertical channels of one or more additional operation modules of a modular support system;
a first sidewall comprising a first feature configured to couple to a first recess sidewall of an interlock module that is disposed around a central core of the modular support system; and
a second sidewall disposed opposite the first sidewall, the second sidewall comprising a second feature configured to couple to a second recess sidewall of the interlock module; and
one or more devices disposed in the interior volume, wherein an electrical interconnect is configured to electrically couple the one or more devices with the central core through a rear wall of the enclosure structure, and wherein the one or more devices are associated with one or more of water treatment, power generation, or communication.

9. The operation module of claim 8, wherein:
the upper wall comprises an upper metal plate enclosed in first plastic;
the lower wall comprises a lower metal plate enclosed in second plastic;
the first sidewall comprises one or more metal inserts enclosed in third plastic; and
the one or more metal inserts couple the upper metal plate to the lower metal plate.

10. The operation module of claim 9, wherein one or more of the first plastic, the second plastic, or the third plastic have anti-bacterial additives, wherein the operation module is configured to receive water in the interior volume.

11. The operation module of claim 8 further comprising a radio frequency identification (RFID) tag, wherein responsive to coupling the operation module with the central core, a processing device of the modular support system is to determine information associated with the operation module based on an identifier of the RFID tag.

12. The operation module of claim 8, wherein the one or more devices comprise one or more of:
a processing device;
one or more valves;
a pump to draw water from a water source;
communication equipment;
a motor to adjust position of one or more solar panels; or
a battery to store power generated using solar energy.

13. The operation module of claim 8, wherein the rear wall further forms a channel for a cable associated with storing power generated using solar energy in one or batteries.

14. The operation module of claim 8, wherein a pipe is routed from a pump disposed in the operation module through a channel formed in the enclosure structure to provide water from a water source into the modular support system for water treatment.

15. A method comprising:
coupling a plurality of interlock modules to a central core of a modular support system by inserting the central core in a corresponding central channel of each of the plurality of interlock modules; and
coupling each of a plurality of operation modules to a corresponding interlock module of the plurality of interlock modules to radially arrange the plurality of operation modules around the central core, wherein coupling of a first operation module of the plurality of operation modules to the corresponding interlock module comprises:
mechanically coupling a first sidewall of the first operation module with a first recess sidewall of the corresponding interlock module;
mechanically coupling a second sidewall of the first operation module with a second recess sidewall of the corresponding interlock module; and
electrically coupling one or more devices disposed in the first operation module with the central core via an electrical interconnect, the one or more devices being associated with one or more of water treatment, power generation, or communication.

16. The method of claim 15 further comprising:
securing the modular support system to a substantially horizontal surface via one or more protrusions that extend from a base of the modular support system.

17. The method of claim 15 further comprising attaching an exoskeleton around the modular support system to further secure the plurality of operation modules to the plurality of interlock modules.

18. The method of claim 17 further comprising coupling a parachute and harness to the exoskeleton for aerial deployment of the modular support system.

19. The method of claim 15 further comprising attaching one or more solar panels to the modular support system.

20. The method of claim 15 further comprising coupling a pipe to a second operation module of the plurality of operation modules, wherein the second operation module comprises a pump to provide water from a water source via the pipe to the modular support system to be treated.

* * * * *